(12) United States Patent
Kawato

(10) Patent No.: US 8,099,509 B2
(45) Date of Patent: Jan. 17, 2012

(54) ACCESS CONTROL UNIT

(75) Inventor: Masahiro Kawato, Tokyo (JP)

(73) Assignee: NEC Corporation, Tokyo (JP)

(*) Notice: Subject to any disclaimer, the term of this patent is extended or adjusted under 35 U.S.C. 154(b) by 443 days.

(21) Appl. No.: 11/815,554

(22) PCT Filed: Jan. 24, 2006

(86) PCT No.: PCT/JP2006/301040
§ 371 (c)(1),
(2), (4) Date: Aug. 3, 2007

(87) PCT Pub. No.: WO2006/082732
PCT Pub. Date: Aug. 10, 2006

(65) Prior Publication Data
US 2009/0164649 A1    Jun. 25, 2009

(30) Foreign Application Priority Data
Feb. 4, 2005 (JP) .................. 2005-029260

(51) Int. Cl.
*G06F 15/16* (2006.01)
(52) U.S. Cl. ...................................................... 709/229
(58) Field of Classification Search .................. 709/226, 709/229
See application file for complete search history.

(56) References Cited

U.S. PATENT DOCUMENTS

2002/0162005 A1* 10/2002 Ueda et al. ............... 713/182
2004/0215780 A1* 10/2004 Kawato ..................... 709/226

FOREIGN PATENT DOCUMENTS

| EP | 1 260 906 | 11/2002 |
| JP | 11-355266 | 12/1999 |
| JP | 11355266 A * | 12/1999 |
| JP | 2000-311138 | 11/2000 |
| JP | 2004-302748 | 10/2004 |
| JP | 2005-503596 | 2/2005 |
| WO | WO-01/82086 | 11/2001 |
| WO | WO-02/061653 | 8/2002 |

* cited by examiner

*Primary Examiner* — Ario Etienne
*Assistant Examiner* — Hee Soo Kim
(74) *Attorney, Agent, or Firm* — Dickstein Shapiro LLP

(57) ABSTRACT

[Means for Solution] Access-control-rule application means (310), upon receiving an access request, refers to an access control rule DB (350) and resource information DB (360), to judge whether the attribute of a rule matched with the request is permitted, denied, or manual approval. The access-control-rule application means (310) requests manual-access-control application means (320) to input a result of approval, if the attribute is manual approval. The manual-access-control application means (320) inputs the result of approval input from a resource administrator's terminal (104) into access-control-rule application means (310), which outputs the result of approval.

11 Claims, 20 Drawing Sheets

FIG. 13

RESOURCE INFORMATION

| RESOURCE ID (resource) | OWNER (owner) | USER (user) | VLAN ID | TARGET HOST | RESERVATION (reservation) |
|---|---|---|---|---|---|
| port#0, L2SW1 | "ADMIN" | SHARED | #0 | — | — |
| port#1, L2SW1 | "ADMIN" | — | #1 | — | — |
| port#2, L2SW1 | "ADMIN" | "DRUGSTORE" | #3 | — | — |
| port#3, L2SW1 | "ADMIN" | "DRUGSTORE" | #3 | — | — |
| port#4, L2SW1 | "ADMIN" | "DRUGSTORE" | #2 | — | — |
| port#5, L2SW1 | "ADMIN" | "BOOKSTORE" | #4 | — | — |
| port#6, L2SW1 | "ADMIN" | — | #1 | — | — |
| LB1 | "ADMIN" | "DRUGSTORE" | — | server03,server04 | — |

FIG. 14

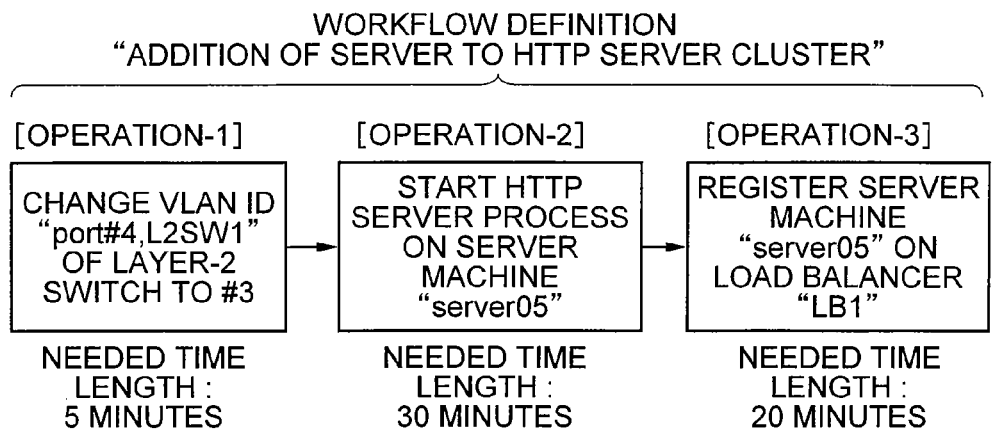

WORKFLOW DEFINITION
"ADDITION OF SERVER TO HTTP SERVER CLUSTER"

FIG. 15

- OPERATION-1
    - OPERATION APPROVAL REQUEST
      (TASK MANAGEMENT UNIT → RESOURCE MANAGEMENT UNIT-A)
        request="authorization",requestor="DRUGSTORE",target="port#4,L2SW1",
        operation="change VLAN ID (#3)"
    - RESPONSE TO OPERATION APPROVAL REQUEST
      (RESOURCE MANAGEMENT UNIT-A → TASK MANAGEMENT UNIT)
        result="permitted",period="2005/2/10 01:00-03:00"

- OPERATION-2
    - OPERATION APPROVAL REQUEST
      (TASK MANAGEMENT UNIT → RESOURCE MANAGEMENT UNIT-B)
        request="authorization",requestor="DRUGSTORE",target="HTTPServer,
        server05",operation="start"
    - RESPONSE TO OPERATION APPROVAL REQUEST
      (RESOURCE MANAGEMENT UNIT-B → TASK MANAGEMENT UNIT)
        result="permitted",period="2005/2/10 00:00-02:00"

- OPERATION-3
    - OPERATION APPROVAL REQUEST
      (TASK MANAGEMENT UNIT → RESOURCE MANAGEMENT UNIT-A)
        request="authorization",requestor="DRUGSTORE",target="LB1",
        operation="add target (server05)"
    - RESPONSE TO OPERATION APPROVAL REQUEST
      (RESOURCE MANAGEMENT UNIT-A → TASK MANAGEMENT UNIT)
        result="permitted",period="2005/2/10 04:00-05:00"

FIG. 16

ACCESS CONTROL RULE

| # | TARGET RESOURCE OF OPERATION (target) | CONTENTS OF OPERATION (operation) | RESOURCE USER (user) | OPERATION REQUESTOR (requesor) | PERMITTED/ DENIED | TIME PERIOD |
|---|---|---|---|---|---|---|
| 1 | port#4,L2SW1 | change VLAN ID | "BOOKSTORE" | "BOOKSTORE" | PERMITTED | |
| 2 | port#4,L2SW1 | change VLAN ID | ARBITRARY | IDENTICAL TO USER | MANUAL APPROVAL | |
| 3 | port#4,L2SW1 | change VLAN ID | ARBITRARY | DIFFERENT FROM USER | DENIED | |
| 4 | port#4,L2SW1 | change USER | ARBITRARY | ARBITRARY | MANUAL APPROVAL | |
| 5 | LB1 | add target (HOST BELONGING TO BOOKSTORE) | "BOOKSTORE" | "BOOKSTORE" | PERMITTED | |
| 6 | LB1 | add target (HOST BELONGING TO USER) | ARBITRARY | IDENTICAL TO USER | MANUAL APPROVAL | |
| 7 | LB1 | delete target (HOST BELONGING TO BOOKSTORE) | "BOOKSTORE" | "BOOKSTORE" | PERMITTED | |
| 8 | LB1 | delete target (HOST BELONGING TO USER) | ARBITRARY | IDENTICAL TO USER | MANUAL APPROVAL | |

FIG. 17

ACCESS CONTROL RULE

| # | TARGET RESOURCE OF OPERATION (target) | CONTENTS OF OPERATION (operation) | RESOURCE USER (user) | OPERATION REQUESTOR (requesor) | PERMITTED/ DENIED | TIME PERIOD |
|---|---|---|---|---|---|---|
| 1 | port#4,L2SW1 | change VLAN ID | "BOOKSTORE" | "BOOKSTORE" | PERMITTED | |
| 2 | port#4,L2SW1 | change VLAN ID (#3) | "DRUGSTORE" | "DRUGSTORE" | PERMITTED | 2005/2/10 01:00-03:00 |
| 3 | port#4,L2SW1 | change VLAN ID | ARBITRARY | IDENTICAL TO USER | MANUAL APPROVAL | |
| 4 | port#4,L2SW1 | change VLAN ID | ARBITRARY | DIFFERENT FROM USER | DENIED | |
| 5 | port#4,L2SW1 | change USER | ARBITRARY | ARBITRARY | MANUAL APPROVAL | |
| 6 | LB1 | add target (HOST BELONGING TO BOOKSTORE) | "BOOKSTORE" | "BOOKSTORE" | PERMITTED | |
| 7 | LB1 | add target (server05) | "DRUGSTORE" | "DRUGSTORE" | PERMITTED | 2005/2/10 04:00-05:00 |
| 8 | LB1 | add target (HOST BELONGING TO USER) | ARBITRARY | IDENTICAL TO USER | MANUAL APPROVAL | |
| 9 | LB1 | delete target (HOST BELONGING TO BOOKSTORE) | "BOOKSTORE" | "BOOKSTORE" | PERMITTED | |
| 10 | LB1 | delete target (HOST BELONGING TO USER) | ARBITRARY | IDENTICAL TO USER | MANUAL APPROVAL | |

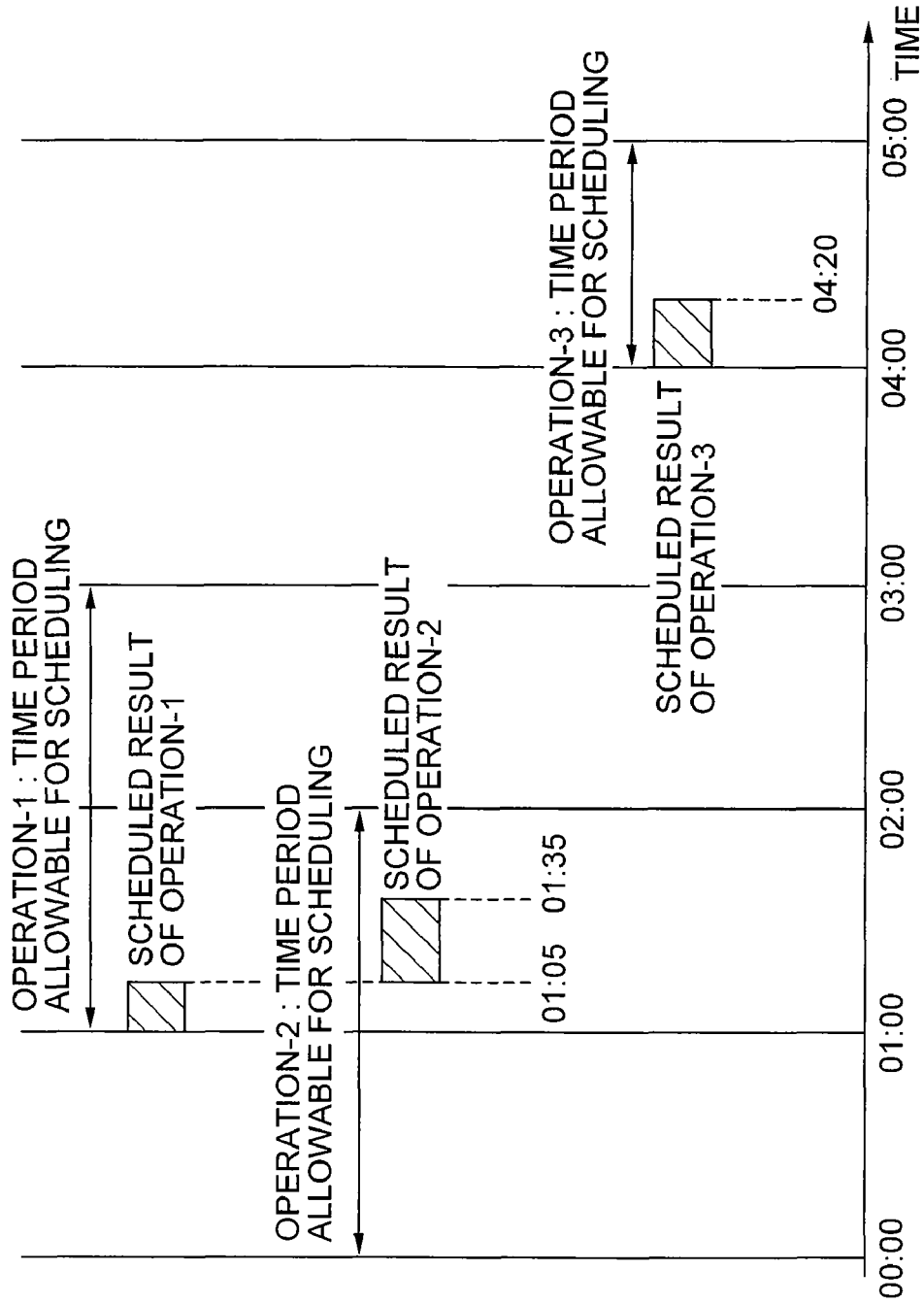

FIG. 19

- OPERATION-1
  - OPERATION RESERVATION REQUEST
    (TASK MANAGEMENT UNIT→RESOURCE MANAGEMENT UNIT A)
    request="reservation",requestor="DRUGSTORE",target="port#4,L2SW1",
    operation="change VLAN ID (#3)", period="2005/2/10 01:00-01:05"
  - RESPONSE TO OPERATION RESERVATION REQUEST
    (RESOURCE MANAGEMENT UNIT-A → TASK MANAGEMENT UNIT)
    result="succeeded",reservationID="RM_A$rsvID=105"

- OPERATION-2
  - OPERATION RESERVATION REQUEST
    (TASK MANAGEMENT UNIT→RESOURCE MANAGEMENT UNIT B)
    request="reservation",requestor="DRUGSTORE",target="HTTPServer,
    server05",operation="start" period="2005/2/10 01:05-01:35"
  - RESPONSE TO OPERATION RESERVATION REQUEST
    (RESOURCE MANAGEMENT UNIT-B → TASK MANAGEMENT UNIT)
    result="succeeded",reservationID="RM_B$rsvID=37"

- OPERATION-3
  - OPERATION RESERVATION REQUEST
    (TASK MANAGEMENT UNIT→RESOURCE MANAGEMENT UNIT A)
    request="reservation",requestor="DRUGSTORE",target="LB1",
    operation="add target (server05)",period="2005/2/10 04:00-04:20"
  - RESPONSE TO OPERATION RESERVATION REQUEST
    (RESOURCE MANAGEMENT UNIT-A → TASK MANAGEMENT UNIT)
    result="succeeded",reservationID="RM_A$rsvID=106"

FIG. 21

- OPERATION-1
  - OPERATION EXECUTION REQUEST
    (TASK MANAGEMENT UNIT→RESOURCE MANAGEMENT UNIT A)
    request="execution",requestor="DRUGSTORE",
    reservationID="RM_A$rsvID=105"
  - RESPONSE TO OPERATION EXECUTION REQUEST
    (RESOURCE MANAGEMENT UNIT-A →TASK MANAGEMENT UNIT)
    result="succeeded"
- OPERATION-2
  - OPERATION EXECUTION REQUEST
    (TASK MANAGEMENT UNIT→RESOURCE MANAGEMENT UNIT B)
    request="execution",requestor="DRUGSTORE",
    reservationID="RM_B$rsvID=37"
  - RESPONSE TO OPERATION EXECUTION REQUEST
    (RESOURCE MANAGEMENT UNIT-B →TASK MANAGEMENT UNIT)
    result="succeeded"
- OPERATION-3
  - OPERATION EXECUTION REQUEST
    (TASK MANAGEMENT UNIT→RESOURCE MANAGEMENT UNIT A)
    request="reservation",requestor="DRUGSTORE",
    reservationID="RM_A$rsvID=106"
  - RESPONSE TO OPERATION EXECUTION REQUEST
    (RESOURCE MANAGEMENT UNIT-A →TASK MANAGEMENT UNIT)
    result="succeeded"

FIG. 22

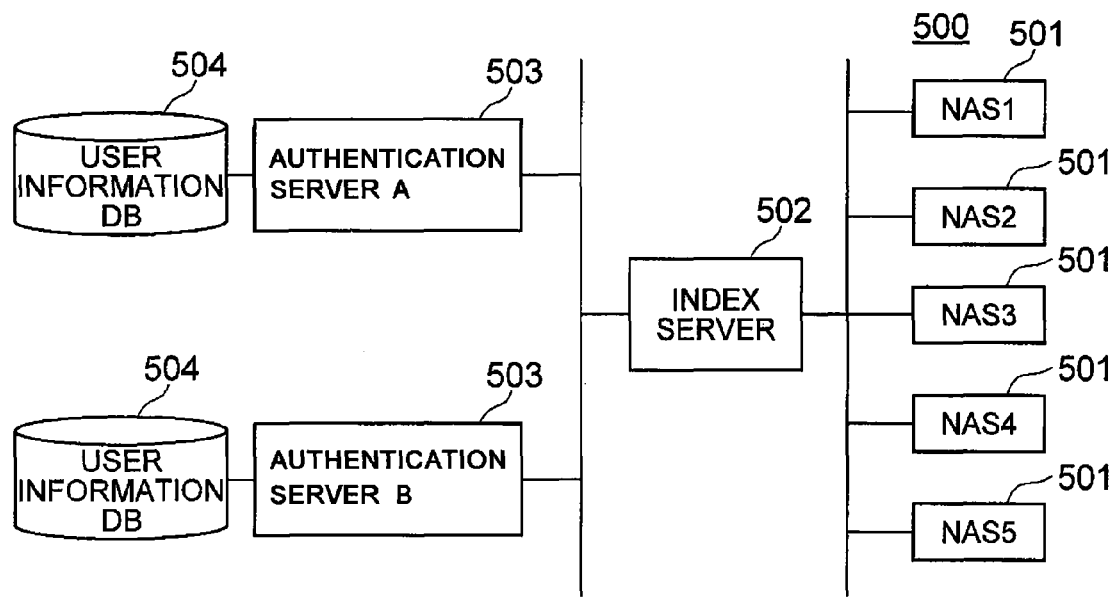

ACCESS CONTROL UNIT

FIELD OF THE INVENTION

The present invention relates to an access control unit, and more particularly, to an access control unit in a system in which operation to a resource is accompanied by access control. The present invention also relates to workflow execution system, distributed access control method, and distributed access control program.

BACKGROUND OF THE INVENTION

Access control is such that only limited users are permitted to refer to a file or change the configuration thereof. In the access control, the owner of a file, for example, is allowed to set an attribute that only the owner can overwrite the file, only users belonging to the group to which the owner belongs can overwrite the file, or all the users are allowed only to refer to the file, for example. An example of the conventional distributed access control system is described in Patent Publication JP-2000-311138A. An object of this conventional distributed access control system is to perform, upon occurring of an access to a server from a number of end users, an efficient verification for legitimacy of the access.

FIG. 22 shows the configuration of the conventional distributed access control system described in the above patent publication. The distributed access control system 500 includes a plurality of network access servers (NASs) 501, a single index server 502, a plurality of authentication servers 503, and a plurality of user information databases 504 each corresponding to one of the authentication servers. When an end user forwards an access request to one of the plurality of NASs 501, the NAS 501 which received the request refers to the index server 502 and determines one of the authentication servers 503 to which the authentication request is to be transferred. Thereafter, the authentication request is transmitted to the thus determined authentication server 503, and the authentication server 503 performs authentication and verifies the legitimacy of the request.

DISCLOSURE OF THE INVENTION

Problems to be Solved by the Invention

Assume the case where the distributed access control system is applied to automated operation management of a distributed computing system. The automated management of a distributed computing system refers to the mechanism in which a series of operations are performed automatically, the series of operations including addition or removal of a server to/from a clustered server group, update of an application on a server, etc. needed for changing the configurations of the distributed computing system. In the automated operation management in the system, it is necessary to use a mechanism for managing and applying the access control information specifying an object resource, an authorized person, subject operation and occasion of the operation.

For applying the above conventional distributed access control system to the automated operation management of a distributed computing system, there are the following problems. A first problem is that setting of permission or rejection to an access in advance is required with respect to all the combinations of any resource and any operation. The conventional distributed access control system handles the automated access control only by the authentication server, and do not handle application of the access control by a manual processing. However, it is not practical to manually prepare all the access control rules, because the number of the object resources for operation and the number of possible operations are enormous in the automated operation management of the distributed computing system.

A second problem originates from the fact that the access control and execution of the operation are treated as the processing of response to a single request, and is such that a longer time of the access control results in a longer waiting time of the operation. More specifically, if a longer time is needed for obtaining the result of judgment for the access permission or denial, as in the case of a manual execution of the access control, it takes a longer time before the judgment whether or not execution of the operation is possible is obtained, whereby the waiting time for operation of the resource is prolonged. The prolonged waiting time for the operation causes a reduction in the availability of resources.

A third problem is that it is unable to handle the time restriction with respect to the operation to resources. In the automated operation management of the distributed computing system, since the operation to resources may affect quality of service to the user, a restriction exist as to the time period when the operation to resources is permitted. In particular, if a combination of operations is executed to a plurality of resources, as in the case of addition of a server to a server cluster, for example, which is accompanied by changing the setting of the servers and a load balancer to the server cluster, it is necessary to perform the operation in the state where the time restrictions in operation to all the resources are satisfied. However, the conventional technique does not provide means for performing operation in the state where this type of restriction is satisfied.

It is an object of the present invention to solve the above problems and to provide an access control unit which does not require preparation of all the access control rules in advance, which determine an access permission or denial as to the combinations of resource and operation.

It is another object of the present invention to provide a workflow execution system which is capable of reducing the influence that a prolonged access control processing exerts on the availability of the resources upon executing an operation to a resource.

It is another object of the present invention to provide a workflow execution system which is capable of executing, upon executing operations in combination to a plurality of resources, the operations to resources in a state for satisfying time restrictions with respect to the operations to the resources, and a method and program thereof.

Means for Solving the Problem

The present invention provides an access control unit for restricting an access from a user executing an operation to a plurality of resources connected to a network, including: a database which stores therein an access control rule describing a permission/denial attribute for a combination including identification information of a target resource for access, content information of operation to resource, and user identification information; and access-control-rule application means which refers to the database upon occurring of an access request, judges in a judgment whether the access occurring is to be permitted or denied based on the access control rule, requests an external judgment whether the access occurring is to be permitted or denied if the judgment does not decide permission or denial, and outputs a result of the external judgment, which is input based on the request, as a judgment result.

The present invention provides an access control method using a computer for controlling an access from a user that executes operations to a plurality of resources connected to a network, including the steps of: the computer, upon occurring of an access request, referring to a database which stores therein an access control rule describing a permission/denial attribute for a combination including identification information of a target resource for access, content information of operation to resource, and user identification information, and judging whether the access occurring is to be permitted or denied based on the access control rule; and the computer requesting an external judgment whether the access occurring is to be permitted or denied if the judging step does not decide permission or denial, to output a result of the external judgment, which is input based on the request, as a judgment result.

The present invention provides a program for an access control unit for controlling an access from a user that executes operations to a plurality of resources connected to a network, the program allowing the access control unit to execute the processing of: referring, upon occurring of an access request, to a database which stores therein an access control rule describing a permission/denial attribute for a combination including identification information of a target resource for access, content information of operation to resource, and user identification information, and judging whether the access occurring is to be permitted or denied based on the access control rule; and requesting an external judgment whether the access occurring is to be permitted or denied if the judging processing does not decide permission or denial, and outputting a result of the external judgment, which is input based on the request, as a judgment result.

In the access control unit, method and program of the present invention, the access control rule having an access permission/denial attribute including an external reference, in addition to the permission and denial, is used for the access control. In this configuration, if the access permission/denial attribute is the external reference, input of permission or denial is requested as the result of the external judgment, and the thus input judgment result is output as the judgment result of the access permission/denial. By using the external reference in this way, it is not necessary to prepare in advance the access control rules that decide the access permission or denial for all of the operations.

In the access control unit, method and program of the present invention, a configuration may be employed wherein the external judgment is input by an administrator. In this case, the permission or denial input by the administer is output as the judgment result to the access request.

In the access control unit of the present invention, a configuration may be employed wherein the access-control-rule application means stores the result of the external judgment into the database as a new access control rule. In the access control method of the present invention, a configuration further including the step of the computer storing the result of the external judgment into the database as a new access control rule may be employed. In the program of the present invention, a configuration further allowing the access control unit to perform the processing of storing the result of the external judgment into the database as a new access control rule may be employed. In such a case, by reflecting the result of the external judgment input as the external judgment in the database, the access permission/denial attribute is not judged as an external judgment in a subsequent access request.

In the access control unit, method and a program of the present invention, a configuration may be employed wherein the external judgment includes approval information on the access request, and the approval information is accompanied by information of a time period, during which a judgment of the approval information is to be applied. In this case, the access permission may be output while limiting the same to the specific time period.

The present invention provides a workflow execution system for executing based on a workflow operations to a plurality of resources connected to a network, including: approval request means which retrieves each operation from the workflow to be executed, and outputs an access request for the each operation retrieved, the access request including information of a target resource for the each operation, content information of the each operation, and identification information of a user that executes the each operation, to thereby issue an inquiry whether the each operation is permitted or denied; access-control-rule application means which refers to a database storing therein an access control rule describing an access permission/denial attribute for a combination including identification information of a target resource for access, content information of operation to resource, and user identification information, judges in a judgment whether the access request occurring is permitted or denied based on the access control rule, requests an external judgment whether the access request is to be permitted or denied if the judgment does not decide permission or denial, and outputs a result of the external judgment, which is input based on the request, as a judgment result; and
operation execution means which performs the each operation to resource based on the workflow after an access permission for all of the operations is obtained from the access-control-rule application means.

The present invention provides a workflow execution method using a computer for executing, based on a workflow, operations to a plurality of resources connected to a network, including: the computer retrieving each operation from the workflow to be executed, and issuing an access request for the each operation retrieved, the access request including information of a target resource for the each operation, content information of the each operation, and identification information of a user that executes the each operation; the computer, upon occurring of the access request, referring to a database storing therein an access control rule describing an access permission/denial attribute for a combination including identification information of a target resource for access, content information of operation to resource, and user identification information, and judging whether the access request occurring is permitted or denied based on the access control rule; the computer requesting an external judgment whether the access request is to be permitted or denied if the judging step does not decide permission or denial, and outputting a result of the external judgment, which is input based on the requesting, as a judgment result; and the computer performing the each operation to resource based on the workflow after an access permission for all of the operations is obtained.

The present invention provides a program for a workflow execution unit for executing, based on a workflow, operations to a plurality of resources connected to a network, the program allowing the workflow execution unit to perform the processings of: retrieving each operation from the workflow to be executed, and issuing an access request for the each operation retrieved, the access request including information of a target resource for the each operation, content information of the each operation, and identification information of a user that executes the each operation; referring, upon occurring of the access request, to a database storing therein an access control rule describing an access permission/denial attribute for a combination including identification information of a target resource for access, content information of operation to resource, and user identification information, and judging whether the access request occurring is permitted or denied based on the access control rule; requesting an external judgment whether the access request is to be permitted or denied if the judging processing does not decide permission or denial, and outputting a result of the external judgment, which is input based on the request, as a judgment result; and performing the each operation to resource based on the workflow after an access permission for all of the operations is obtained.

In the workflow execution system, method and program of the present invention, for example, the access control rule having an access permission/denial attribute to resource operation including an external reference, in addition to permission and denial, is used for the access control. If the access permission/denial attribute is the external reference, input of permission or denial is requested and the thus input judgment result is output as the judgment result of the access permission/denial. Thus, resource operation can be performed based on the workflow, even without preparing in advance the access control rules for deciding the access permission or denial for all of the operations in the database.

In the workflow execution system of the present invention, a configuration further including execution-schedule creation means which determines an execution time for the each operation in the workflow and creates a schedule, if a judgment result for the access request by the access-control-rule application means is an access permission for all of the operations may be employed. In the workflow execution method of the present invention, a configuration further including the step of the computer determining an execution time for the each operation in the workflow to create a schedule, if a judgment result for the access request by the access permission/denial step is an access permission for all of the operations may be employed. In the program of the present invention, a configuration further allowing the workflow execution unit to perform the processing of determining an execution time for the each operation in the workflow to create a schedule, if a judgment result for the access request by the access permission/denial processing is an access permission for all of the operations may be employed. If a time restriction is imposed upon the operation, for example, the execution schedule is created so as to satisfy the time restriction, whereby execution of the workflow can be performed.

In the workflow execution system of the present invention, a configuration may be employed wherein the access-control-rule application means stores the result of the input external judgment into the database as a new access control rule. In the workflow execution method of the present invention, a configuration further including the step of the computer (300) storing the result of the external judgment into the database (350) as a new access control rule may be employed. By employing these configurations, the result of the external judgment input as the external judgment is reflected in the database, whereby the access permission/denial attribute is not judged as an external judgment in the subsequent access request.

In the workflow execution system of the present invention, a configuration further including: reservation request means which outputs, for each operation in the schedule, a reservation request including information of target resource for the each operation, content information of the each operation, identification information of a user that executes the each operation, and execution time information for the each operation; and operation reservation means which transmits, upon receiving the reservation request, an access request to the access-control-rule application means, to issue an inquiry whether the reservation request is permitted or denied, and registers an operation reservation if the reservation is permitted, wherein the operation execution means executes the each operation based on the registered operation reservation may be employed. In the workflow execution method of the present invention, a configuration further including the steps of: the computer outputting, for each operation in the schedule, a reservation request including information of target resource for the each operation, content information of the each operation, identification information of a user that executes the each operation, and execution time information for the each operation; and the computer, upon occurring of the reservation request, referring to the database to examine whether the reservation request is to be permitted or denied.

In the program of the present invention, a configuration further allowing the workflow execution unit (200, 300) to perform the processings of: outputting, for each operation in the schedule, a reservation request including information of target resource for the each operation, content information of the each operation, identification information of a user that executes the each operation, and execution time information for the each operation; and referring, upon occurring of the reservation request, to the database (350) to examine whether the reservation request is to be permitted or denied may be employed.

Effect of the Invention

In the access control unit, workflow execution system, method and program of the present invention, if an access permission or denial cannot be decided, the external reference is used to decide the access permission or denial, whereby the access control can be realized even without preparing in advance the access control rules for all of the operations. Thus, in the workflow execution system, it is not necessary to prepare in advance the complete access control rules with respect to the object resources for operation, for the automated operation management of resources, thereby reducing the initial costs for application of the automated management.

BEST MODE FOR CARRYING OUT THE INVENTION

Hereinafter, an embodiment of the present invention will be described in detail with reference to the drawings. FIG. 1 shows the configuration of a workflow execution system according to the embodiment of the present invention in a block diagram. The workflow execution system 100 includes one or more resource management unit (resource manager) 300, and one or more task management unit (application manager) 200, which are connected together via a network 101. The workflow execution system 100 performs the workflow for execution of automated operation management to the resources, such as a large number of servers, network equipment and storage devices, in a data center receiving therein the resources. Alternatively, the workflow execution system 100 performs the workflow for execution of automated operation management to the resources in a computing system having a configuration wherein a plurality of data centers and a plurality of in-house computer networks are connected together.

The task management unit 200 is connected to a task administrator's terminal 103. The resource management unit 300 is connected to the resource administrator's terminal 104, and also connected to a plurality of resources 400 via a network 102. Network 101 is configured by, for example a LAN (Local Area Network) or WAN (Wide Area Network), and network 102 is configured by, for example, a LAN. The task administrator's terminal 103 and resource administrator's terminal 104 each are configured by a computer terminal including output devices, such as a display unit, and input devices, such as a keyboard.

The resource management units 300 and task management unit 200 each are configured by a computer unit having a program execution function and a network connection function. The task administrator's terminal 103 and resource administrator's terminal 104 are connected to the resource management unit 300 and task management unit 200, respectively, directly or via a network. Alternatively, the task administrator's terminal 103 and resource administrator's terminal 104 are installed in the task management unit 200 and resource management unit 300, respectively. The task management unit 200 manages the task on the computing system serviced to the user. The resource management units 300 each manage a plurality of resources 400 configuring the distributed computing system. The resources 400 are devices used for achieving a task, and more specifically, include computers, switches, routers, load balancers, firewalls, storage devices etc.

The task management unit 200 requests the resource management units 300 to execute an operation to the resources 400 under the management thereof, in order to provide a service to the user. The resource management units 300 execute an operation to the resources 400 based on the request from the task management unit 200. Execution of the operation by the resource management units 300 is accompanied by an access control processing in which an admission or denial of the operation is judged. The workflow execution system 100 may include an arbitrary number of task management units 200 according to the number of tasks. In addition, an arbitrary number of resource management units 300 may be provided according to the number of organizations or sections which manage the resources 400.

Suppose the case where addition of a server is needed due to an increase of the load, for example, when a user is performing a task under a specific environment configured by a plurality of resources 400. In this case, the task administrator creates a workflow for indicating the addition of a server by using the task administrator's terminal 103, and inputs the same into the task management unit 200. The task management unit 200 instructs the resource management unit 300, which manages the target server (resource 400) of addition, to execute the workflow for addition of the server.

FIG. 2 shows the configuration of the task management unit 200 in a block diagram. The task management unit 200 includes workflow control means 210, approval request means 220, execution-schedule creation means 230, operation-reservation request means 240, operation-execution request means 250, workflow definition DB 260, and workflow storage section 270. The workflow definition DB 260 is configured by a database storing therein definition of the workflows which may be the subject of execution. The task administrator can select a workflow stored in the workflow definition DB 260 as the subject for the execution. The workflow storage section 270 is configured by a storage unit, such as a semiconductor memory or a magnetic disk, and temporarily stores therein workflows for the subject of processing and the execution schedule thereof.

The workflow control means 210, upon input of a workflow from the task administrator's terminal 103, consecutively calls the approval request means 220, execution-schedule creation means 230, operation-reservation request means 240 and operation-execution request means 250, and performs the processing of approval, creation of an execution schedule, reservation and execution at each stage. The approval request means 220 transmits an approval request to the resource management units 300, and receives a response to the approval request. The execution-schedule creation means 230 performs scheduling of each operation included in the workflow. The operation-reservation request means 240 requests the resource management unit 300 to reserve execution of the operation according to the schedule, which the execution-schedule creation means 230 created, and receives a response to the operation reservation request. The operation-execution request means 250 requests the resource management unit 300 to execute the reserved operation, and receives the result of the executed operation.

FIG. 3 shows the configuration of the resource management unit 300 in a block diagram. The resource management unit 300 includes access-control-rule application means 310, manual-access-control application means 320, operation reservation means 330, operation execution means 340, access control DB 350, and resource information DB 360. The resource information DB 360 stores therein the resource information of each resource 400. The resource information includes information specifying the user, and information on the operation reservation. The access control DB 350 stores therein a plurality of access control rules.

The access control rule includes one of "permitted", "denied", and "external reference", as an access permission/denial attribute of a combination including the object resource for operation, contents of the subject operation, resource user, and operation requester. For example, the access control rule includes an attribute of "permitted" for the combination including the object resource for operation, "load balancer", contents of the subject operation, "target addition", resource user, "user A", and operation requestor, "user A." If the access permission/denial attribute is "permitted", another attribute for specifying a time period when the access is to be permitted may be set in the access control rule. Other than the access permission/denial and accessible time period, the operation requestor may be described in a format which does not specify a concrete value, for example, "identical to resource user".

If an operation approval request is transmitted from the task management unit 200, the access-control-rule application means 310 judges a permission or denial for the operation requested. The access-control-rule application means 310, upon receiving the operation approval request, refers to the resource information DB 360, to acquire the current user of the resource 400 which is the target for the operation approval request. Thereafter, the access-control-rule application means 310 refers to the access control DB 350, to select a rule which is matched with the combination including the object resource for the operation requested, contents of subject operation and operation requester, and judges whether the attribute of the combination is "permitted", "denied" or "external reference". The access-control-rule application means 310 requires input of the access permission/denial attribute from the outside, if the attribute of the matched rule is "external reference." For example, if "manual approval" is specified as the external reference, an approval request is transmitted to the manual-access-control application means 320, thereby requesting input of the access permission/denial attribute by using a manual approval.

The manual-access-control application means 320 requests the resource administrator's terminal 104 to input an approval result for the combination including the target resource for operation, contents of the subject operation, resource user, and operation requester. The resource administrator inputs "permitted" or "denied" as the approval result for the combination. The access-control-rule application means 310 receives the result of this manual approval processing, and adds the result to the access control DB as a new rule. For example, if "permitted" is given to the combination including the target resource for operation, "load balancer", contents of the subject operation, "target addition", resource user, "user B", and operation requester, "user B", as a result of the manual approval processing, a rule that provides an attribute of "permitted" to that combination is added into the access control DB 350. Since "permitted" or "denied" is determined by the resource administrator for the manual approval, the new rule added into the access control DB 350 does not have an attribute of "manual approval."

If an operation reservation request is forwarded from the task management unit 200, the operation reservation means 330 performs an access control processing via the access-control-rule application means 310, to reserve the operation. The conditions for allowing the operation reservation to succeed include a successful judgment in the access control to operation of the contents of reservation, and no other operation being reserved to the same resource in the overlapping time period. The operation reservation means 330, upon succeeding in the reservation of operation, assigns new reservation ID to the operation, and notify the reservation ID to the task management unit 200. In addition, the operation reservation means 330 stores the reservation information including the reservation ID, subscriber, contents of the operation, and the time period in the resource information DB 360. The manual access control is not applied in the access control processing at the operation reservation stage. This is because the operation permitted in the approval stage matches a rule having no attribute of "manual approval" without fail.

The operation execution means 340, upon transmission of an operation execution request from the task management unit 200, retrieves the corresponding operation reservation request from the resource information DB 360, and performs the operation to the resource 400 according to the contents. The conditions for allowing a successful execution of the operation include: existence of reservation information in the resource information DB 360, having a reservation ID identical to the reservation ID in the operation execution request; coincidence of the user requesting the operation execution with the user included in the reservation information; and inclusion of the time instant for the operation in the time period of the reservation information. The operation execution means 340 notifies the result of the execution to the task management unit 200, after completion of the execution of operation to the resource 400.

Operation of the task management unit 200 will be described. FIG. 4 shows the operational procedure by the task management unit 200 in a flowchart. The workflow control means 210, upon input of a workflow to be performed from the task administrator's terminal 103, stores the input workflow in the workflow storage section 270 (step S401), and calls the approval request means 220 to start processing of the approval stage (step S402). The workflow input at step S401 may be directly input from the task administrator's terminal 103, or may be acquired from the workflow definition DB 260. The approval request means 220 requests the resource management unit 300 to approve the approval request as to each operation in the workflow stored in the workflow storage section 270 (step S403). The approval request means 220 receives a response to the approval request from the resource management unit 300, and notifies the result of approval processing to the workflow control means 210.

FIG. 5 shows the procedure of the approval processing which the approval request means 220 performs. The approval request means 220 performs the approval processing of step S403 according to the procedure as described hereinafter. First, the approval request means 220 retrieves an operation for which the approval is not completed from the workflow storage section 270 (step S501). It is not necessary in step S501 to take into consideration a dependency between the operations in the workflow, and an arbitrary order may be employed for the retrieval. Subsequently, with respect to the operation retrieved at step S501, an operation approval request is transmitted to the resource management unit 300 by which the object resource 400 for the operation is managed (step S502).

The operation approval request, which the approval request means 220 transmits to the resource management unit 300 at step S502, includes information specifying the requestor of the approval request, i.e., the ID of the task management unit 200 which transmitted the approval request (requester), information specifying the target resource for the processing (target), and contents of the processing (operation). Here, in order to ascertain coincidence of the requestor's information included in the operation approval request with the actual requester, a known authentication mechanism may be used. This point is similar in the case of the operation reservation request which the operation-reservation request means 240 performs, and the operation execution request which the operation-execution request means 250 performs. Examples of the authentication mechanism include known SSL/TLS (Secure Socket Layer/Transport Layer Security), Kerberos, etc.

The approval request means 220 receives a response to the approval request transmitted at step S502 from the resource management unit 300 (step S503). The approval request means 220 receives "permitted" or "denied" in step S503, which shows the result of permission/denial for operation (result), as a response to the approval request. When the operation is permitted, the approval request means 220 receives time period information which shows the time period (combination of start time and finish time) at which the operation is permitted (period). The approval request means 220 judges whether the operation is permitted or denied (step S504), based on the response received at step S503, and notifies, upon denial of the operation, the workflow control means 210 of the failed approval processing (step S507).

The approval request means 220, upon judging that the operation is permitted at step S504, judges whether or not the approval processing is completed as to all the operations included in the workflow (step S505). The approval request means 220, upon judging at step S505 that there is a remaining operation for which the approval processing is not completed, returns to step S501, retrieves the remaining operation for which the approval processing is not completed, and performs the approval processing for the operation. If the approval processing is completed for all the operations and all the operations are permitted by the resource management unit 300, the approval request means 220 notifies the workflow control means 210 of the successful approval processing (step S506).

Back to FIG. 4, the workflow control means 210, upon receiving the notice of the successful approval processing from the approval request means 220, calls the execution schedule 230 to thereby start processing of the schedule creation stage (step S404). The workflow control means 210, upon receiving a notice of the failed approval processing, displays the failed workflow execution on the task administrator's terminal 103 to end the processing. The execution-schedule creation means 230 reads the workflow stored in the workflow storage section 270, and creates the execution schedule as to the workflow (step S405).

FIG. 6 shows the procedure of execution-schedule creation processing. The execution-schedule creation means 230 determines the time period during which each operation should be performed, and creates an execution schedule according to the procedure described hereinafter. The execution-schedule creation means 230 first retrieves an operation from the workflow stored in the workflow storage section 270 (step S601). In step S601, the execution-schedule creation means 230 retrieves from the workflow an operation for which the schedule is not registered and the schedule of which depends on the other operation's schedules that are registered. Subsequently, the execution-schedule creation means 230 determines the time period assigned to the operation retrieved at step S601 (step S602).

The execution-schedule creation means 230 determines a fastest-starting time period as the assigned time period in step S602, the fastest-starting time period satisfying the following two conditions.

Condition 1: the time period to be assigned forms part of the time period shown in the response to the operation approval request received at step S503 (FIG. 5), and satisfies the restriction of the assigned time period.

Condition 2: the time period starts after the scheduled finish time for all the operations preceding to the subject operation of the object resource.

Here, upon determining the assigned time period, the time length required of operation for processing must be known beforehand. This information is given by the resource administrator or the task administrator, and stored in the execution-schedule creation means 230.

The execution-schedule creation means 230 judges whether or not the assignment of the time period is successfully determined (step S603), and if it is judged the assignment of the time period is successfully determined, the execution-schedule creation means 230 judges whether or not the assigned time period (schedule) is determined for all the operations (step S604). If it is judged that there is a remaining operation for which the assigned time period is not determined, the execution-schedule creation means 230 returns to step S601, retrieves the remaining operation, and determines the assigned time period for the operation.

The execution-schedule creation means 230, after finishing determination of the assigned time period for all the operations, notifies the workflow control means 210 of the successful creation of the schedule (step S605), and ends the processing. If it is judged at step S603 that determination of the assigned time period is not successful due to absence of the time period to be assigned, the execution-schedule creation means 230 notifies the workflow control means 210 of the unsuccessful creation of the schedule, and ends the processing (step S606).

Back to again FIG. 4, the workflow control means 21, upon receiving the notice of successful schedule creation from the execution-schedule creation means 230, calls the operation-reservation request means 240 to start processing of the reservation stage (step S406). The workflow control means 210, upon receiving the notice of unsuccessful schedule creation, displays the unsuccessful workflow execution on the task administrator's terminal 103, and ends the processing. The operation-reservation request means 240 transmits a reservation request as to the operations in the workflow stored in the workflow storage section 270 to the resource management unit 300 by which operation of the resources 400 is managed, to thereby attempt reservation of the operations (step S407).

The operation reservation request transmitted from the operation-reservation request means 240 to the resource management unit 300 at step S407 includes the requester ID of the operation approval request (requester), the target resource ID of the operation (target), contents of the operation (operation), and a reservation time period (period). Among these, information other than the reservation time period is common with the contents of the operation approval request which the approval request means 220 transmits to the resource management unit 300 at step S403. The reservation time period includes information of the time period assigned by the execution-schedule creation means 230.

The operation-reservation request means 240 receives "succeeded" or "failed" showing the result of reservation as a response to the operation reservation request transmitted. If the reservation is successful, the operation-reservation request means 240 receives the reservation ID for referring to the contents of reservation. The operation-reservation request means 240, upon receiving a notice of successful reservation from the resource management unit 300, notifies the workflow control means 210 of this fact, and upon receiving a response of unsuccessful reservation, notifies the workflow control means 210 of this fact.

The workflow control means 210, upon receiving a notice of successful operation reservation from the operation-reservation request means 240, calls the operation-execution request means 250 to start processing of the execution stage (step S408). The workflow control means 210, upon receiving a notice of unsuccessful operation reservation, displays the unsuccessful workflow execution on the task administrator's terminal 103, and ends the processing. The operation-execution request means 250 transmits an operation execution request with respect to each operation in the workflow stored in the workflow storage section 270 to the resource management unit 300 including the target resource 400 for the each operation, to thereby attempt execution of the each operation (step S409).

The operation execution request that the operation-execution request means 250 transmits to the resource management unit 300 includes the requestor ID of the operation execution request (requester), and the reservation ID contained in the response to the operation reservation request. The operation-execution request means 250 receives "succeeded" or "failed" showing the result of execution from the resource management unit 300. The workflow control means 210 receives the executed result of the operation execution from the operation-execution request means 250, and notifies the same to the task administrator's terminal 103 (step S410). This executed result is shown on the display screen of the task administrator's terminal 103, to notify the task administrator of the executed result of the workflow.

Next, operation of the resource management unit 300 will be described. FIG. 7 shows the procedure of the resource management unit 300 in processing of the approval stage. The access-control-rule application means 310, upon transmission of a notice of approval request from the task management unit 200 at step S403 of FIG. 4, refers to the resource information DB 360 to acquire the configuration information of the resource 400 specified by the approval request (step S701). The access-control-rule application means 310 acquires the current assignment status (current user) of the target resource.

The access-control-rule application means 310 refers to the access control DB 350, and judges whether or not there exists a rule matched with the combination including the ID of the target resource of the approval request (target), contents of operation to the object resources (operation), the ID of the operation requester that issued the approval request (requester), and the ID of the current user of the target resource (user) (step S702). If there is no matched rule, the access-control-rule application means 310 returns "denied" to the task management unit 200 as a response to the approval request (step S703).

If there exists a matched rule at step S702, the access-control-rule application means 310 judges whether the access permission/refusal attribute of the combination is "permitted", "denied" or "manual approval" (step S704). If there are a plurality of matched rules at step S702, it is necessary to select one of them. The selection criterion may use an arbitrary method, wherein all the rules are numbered in advance and one of the rules is selected in an ascending order of the numbers from the plurality of matched rules, for example.

If the access permission/denial attribute is "permitted", the access-control-rule application means 310 transmits "permitted" to the task management unit 200 as the response to the approval request (step S705). If the access permission/denial attribute is "denied", the process shifts to step S703, wherein return mail "denied" is delivered to the task management unit 200. If the access permission/denial attribute is "manual approval", the access-control-rule application means 310 requests the manual-access-control application means 320 to input the result of the approval judgment (step S706). In this case, the access-control-rule application means 310 returns the result of manual approval input by the manual-access-control application means 320 to the task management unit 200 (step S707).

FIG. 8 shows the procedure of manual approval. The manual-access-control application means 320, upon receiving a request of input of the approval result from the access-control-rule application means 310 at step S706, delivers the contents of the approval request to the resource administrator's terminal 104, to request the resource administrator to input the access permission/denial attribute (step S801), and waits for the input of the approval result by the resource administrator (step S802). The resource administrator determines whether the access is permitted or denied based on the contents (target resource for operation, contents of the operation, resource user, and operation requestor) of the approval request, and inputs "permitted" or "denied", as the access permission/denial attribute, into the manual-access-control application means 320. The resource administrator may specify the time period for applying the permission as to the "permitted".

After the resource administrator inputs "permitted" or "denied", the manual-access-control application means 320 adds the input result as a new rule to the access control DB 350 (step S803). The rule added as the new rule at step S803 includes the target resource ID included in the operation approval request (target), contents of the operation included in the operation approval request (operation), current user ID of the target resource (user), requestor ID of the operation approval request (requester), and the access permission/denial attribute input at step S802 (permission). If the time period during which the access is to be permitted is specified, the value of the specified time period is included as the time period (period). The manual-access-control application means 320 returns "permitted" or "denied" to the access-control-rule application means 310 as the result of manual approval (step S804).

FIG. 9 shows the procedure of the resource management unit 300 in processing of the reservation stage. The operation reservation means 330, upon transmission of an operation reservation request from the task management unit 200 at step S407 of FIG. 4, inquires the permission/denial for the operation to the access control means 310 (step S901). The access-control-rule application means 310 refers to the access control DB 350 as to the operation specified by the reservation request, and returns "permitted" or "denied" to the operation reservation means 340 according to a procedure similar to that shown in FIG. 7. It is to be noted however that a "manual approval" is not applied because "permitted" or "denied" is determined in the approval stage.

If the access permission/denial attribute is "permitted" in the access control rule, and if the time period during which the access is permitted is not specified, the access-control-rule application means 310 returns "permitted" for the operation of the reservation request. If the time period is specified, the access-control-rule application means 310 compares the value of the reservation time period in the operation reservation request and the time period of the access control rule against each other, and judges an access permission or denial. The access-control-rule application means 310 judges the operation to be permitted, if the reservation time period forms part of the time period of the access control rule. For example, for the case where the time period in the access control rule is "8:00-12:00, Jan. 10, 2010", if the time period specified by the operation reservation request is "8:00-9:00, Jan. 10, 2010", then "permitted" is returned. On the other hand, if the time period specified by the operation reservation request is "11:00-13:00, Jan. 10, 2010" for the same access control rule, then "denied" is returned.

The operation reservation means 330 judges whether the operation is permitted or denied via the access-control-rule application means 310 (step S902). The operation reservation means 330 creates a reservation ID for the reservation request, and adds the reservation information to the resource information DB 360, if the operation is permitted (step S903). The reservation information includes reservation ID for identifying the contents of reservation (reservation ID), target ID for the operation included in the operation reservation request (target), contents of operation included in the operation reservation request (operation), requestor ID of the operation reservation request (requester), and time period of the subject operation included in the operation reservation request (period). The operation reservation means 330 transmits a response including a reservation success (succeeded) to the task management unit 200 after the addition of reservation information (step S904). The operation reservation means 330, upon judging that the operation is denied at step S902, transmits a response including the failed reservation to the task management unit 200 (step S905).

FIG. 10 shows the procedure of the resource management unit 300 in processing of the operation execution stage. When an operation execution request is transmitted from the task management unit 200 at step S409 of FIG. 4, the operation execution means 340 searches the resource information DB 360 by using, as a key, the reservation ID included in the operation execution request (step S1001), and judges whether or not a reservation corresponding to the reservation ID is registered (step S1002). If the reservation is registered, the operation execution means 340 acquires the contents of operation of the corresponding reservation from the resource information DB 360, and performs operation to the resource 400 based on the contents of the operation (step S1003). The operation execution means 340 transmits a response including the executed result (success or failure) of the operation to the task management unit 200 after the execution of operation (step S1004). The operation execution means 340, upon judging that the reservation request is not registered at step S1002, transmits a response including a failed operation to the task management unit 200 (step S1005).

Hereinafter, operation of the workflow execution system 100 will be described, with reference to a concrete example. FIG. 11 shows a concrete example of the workflow execution system 100. In the drawing, the task administrator's terminal 103, resource administrator's terminal 104, task management unit 200, and resource management unit 300 each are configured as a computer, which has a network connection function, such as TCP/IP. The task administrator's terminal 103 and resource administrator's terminal 104 each are connected to the task management unit 200 or resource management unit 300 via a management LAN 105.

The workflow execution system 100 includes a single task management unit 200, and two resource management units 300. The load balancer (LB1) 401, layer-2 switch (L2SW1) 402, and a plurality of server machines (server01, server02, . . . ) 403 each correspond to a resource 400 shown in FIG. 1. The resource management unit-A 300 keeps the load balancer 401 and layer-2 switch 402 under the control thereof. The resource management unit-B 300 keeps the plurality of server machines 403 under the control thereof. All the resources shown in FIG. 11 are physically connected to the layer-2 switch 402. The layer-2 switch 402 and other resources connected thereto configure a task LAN 106.

The layer-2 switch 402 has a function of dividing the task LAN 106 into a plurality of virtual LAN (Virtual LAN: VLAN). In order to avoid leakage of information and influence by a failure between the tasks, resources connected to the task LAN 106 and belonging to different tasks belong to different task VLANs. The VLAN to which the resources belong is determined by the ID, referred to as VLANID, set for each port on the layer-2 switch 402. The VLAN to which each resource belongs may be changed by changing the VLANID of each port by using the resource management unit 300A.

The load balancer 401 has the function of transferring an HTTP request, issued from an end user, to one of the plurality of server machines 403, and the function of registering the destination server machine 403 based on the instruction from the resource management unit-A 300 and canceling the registration of the same. The plurality of server machines 403 each have the function of dynamically starting and stopping a plurality of server programs including a HTTP (Hypertext Transfer Protocol) server program based on the instruction from the resource management unit-B 300.

FIG. 12 shows the current status of each resource in a block diagram, and FIG. 13 shows an example of the resource information which shows the current status of each resource stored in the resource information DB 360 of the resource management unit-A 300. As shown in FIG. 12, a plurality of server machines 403 managed by the resource management unit-A 300 are connected to separate ports on the layer-2 switch 402. For example, a server machine 403 (server03) is connected to port #2 on the layer-2 switch 402, and another server machine (sever04) is connected to port #3 on the layer-2 switch 402.

Assuming that VLANID to which the HTTP server cluster belongs is #3, for example, the HTTP server cluster is configured by the server machines 403, for which the VLANID of connection port is set at #3, among the server machines 403 connected to the layer-2 switch 402. In the example of FIGS. 12 and 13, the VLANID of "port#2, L2SW1" and "port#3, L2SW1" on the layer-2 switch 402 is #3, and the HTTP server cluster is configured by server03 and server04 connected to these ports. For the load balancer 401, server03 and server04 are registered as the target hosts, whereby the load balancer 401 permits an HTTP request issued from a client to be transferred to server03 and server04.

Hereinafter, assume that a processing of configuration change accompanying the addition of a server to the HTTP server cluster configuring the task of a user "DRUGSTORE" is executed in a workflow. The task administrator creates the workflow for executing the server addition, and instructs the execution of the workflow from the task administrator's terminal 103 to the task management unit 200. FIG. 14 shows an example of the workflow definition, which is the subject of execution. In this example, "operation-1" changes VLANID of the port "port#4, L2SW1" on the layer-2 switch 402, to which server05 is connected, into #3, i.e., VLANID to which the HTTP server cluster belongs. By performing operation-1, server05 is added to the HTTP server cluster. Thereafter, a HTTP server processing is started on server05 by operation-2, and the additional registration of server05 is performed by operation-3 as the target host of the load balancer 401. By performing operation-3, transfer of the HTTP request issued from the client to server05 is permitted.

The task management unit 300 to which execution of the workflow is instructed performs the workflow according to the procedure shown in FIG. 4. The task management unit 200 transmits an operation approval request to the resource management unit-A 300, with respect to operation-1 and operation-3 among the three operations in FIG. 14, and transmits another operation approval request with respect to operation-2 to the resource management unit-B 300. FIG. 15 shows a concrete example of the operation approval request transmitted to the resource management unit 300 from the task management unit 200, and the response transmitted to the task management unit 200 from the resource management unit 300, for each operation. The task management unit 300 transmits "request="authorization", requester="DRUGSTORE", target="port #4, L2SW1", and operation="change VLANID (#3)"", as the operation approval request of operation-1, to the resource management unit-A 300.

FIG. 16 shows an example of the access control rule stored in the access control DB 350 of the resource management unit-A 300. If the task management unit 200 transmits the operation approval request corresponding to operation-1, the access-control-rule application means 310 of the resource management unit-A 300 refers to the resource information DB 360, to examine the current assignment of "port#4, L2SW1" of the layer-2 switch 402 which is the target resource, to acquire the current user. If the resource information DB 360 stores therein the resource information shown in FIG. 13, "DRUGSTORE" is acquired as the current user of "port#4, L2SW1" of the layer-2 switch 402.

The access-control-rule application means 310 refers to the access control DB 350, to search a rule matched with the contents of the approval request of operation-1, more specifically, the combination including target resource of operation, "Port #4 of layer-2 switch 402 (port#4, L2SW1), contents of operation, "affiliated VLAN change" (change VLANID (#3)), resource user, "DRUGSTORE", and operation requester, "DRUGSTORE". In the example of FIG. 16, this combination matches rule-2. Since the access permission/denial attribute of rule-2 is "manual approval", the access-control-rule application means 310 transmits an approval request to the manual-access-control application means 320. The resource administrator selects a time interval of the midnight, for example, where there occur fewer accesses, and inputs a notice from the resource administrator's terminal that operation-1 is permitted from 1:00 to 3:00 a.m. on 2005 Feb. 10. The result of this manual approval is input to the access-control-rule application means 310 from the manual-access control means 320.

The access-control-rule application means 310 requests the manual-access-control application means 320 to input the approval result also with respect to the operation approval request with respect to operation-3. The resource administrator inputs a notice from the resource administrator's terminal 104 that operation-3 is permitted from 4:00 to 5:00 a.m. on 2005 Feb. 10, for example, as the manual approval result. The result of this manual approval is input to the access-control-rule application means 310 from the manual-access control means 320.

The result of manual approval is added as a new rule to the access control DB 350. Thus, the access control rules stored in the access control DB 350 are such that shown in FIG. 17. In FIG. 17, rule-2 and rule-7 are newly added rules based on the result of manual approval. As the result of approval processing, the task management unit 200 receives "result="permitted", period="2005 Feb. 10 01:00-03:00"" as the response to the operation approval request for operation-1, as shown in FIG. 15. The task management unit 200 also receives "result="permitted", period="2005 Feb. 10 04:00-05:00"" as the response to the operation approval request for operation-3.

After the processing of approval stage, the task management unit 200 creates an execution schedule for each operation in the workflow based on the response to the operation approval request. If the responses to the approval requests include the contents shown in FIG. 15, the execution-schedule creation means 230 creates the execution schedule for each operation shown in FIG. 14 according to the procedure shown in FIG. 6, whereby the schedule shown in FIG. 18 is obtained. With reference to FIG. 18, it is shown that the scheduled time period for operation-1, for example, is 01:00-01:05, 2005 Feb. 10 which is included within the time period 01:00-03:00, 2005 Feb. 10 allowed for use in the scheduling.

After the execution schedule is created, the operation-reservation request means 240 transmits the reservation request for operation-1 and operation-2 to the resource management unit-A 300, the reservation request for operation-2 to the resource management unit-B 300. FIG. 19 illustrates a concrete example of the operation reservation requests transmitted from the task management unit 200 to the resource management unit 300 and the responses transmitted from the resource management units 300 to the task management unit 200 for respective operations. Here, the contents of reservation coincide with the execution schedule shown in FIG. 18. The task management unit 200 transmits "request="reservation", requestor="DRUGSTORE", target="port#4, L2SW1", operation="change VLANID (#3)", period="2005 Feb. 10 01:004-01:05"" as the operation reservation request for operation-1 to the resource management unit-A 300.

The resource management units 300, upon receiving the reservation request, performs reservation according to the procedure shown in FIG. 9. For example, if the resource management unit-A 300 receives the reservation request for operation-1, the access-control-rule application means 300 judges whether the access is to be permitted or denied with reference to the access control DB 350 and resource information DB 360. Since rule-2 has been added to the access control DB 350 as the result of manual approval, as shown in FIG. 17, access to the reservation request for operation-1 is permitted based on this rule-2, without applying the manual approval, whereby the reservation succeeds. Similarly, as to operation-3, the access is permitted based on the added rule-7 and the reservation succeeds.

After the successful reservation, the resource management unit-A 300 transmits a notice that the reservation request has succeeded, and the reservation ID assigned to the task management unit 200 to the task management unit 200, and in addition, updates the resource information DB 360, as shown in FIG. 20. Comparing the resource information DB 360 before the reservation (FIG. 13) and the resource information DB 360 after the reservation (FIG. 20), the resource information DB 360 after the reservation additionally includes reservations for two operations, which are shown by reservation ID "RM_A$rsvID=105" for operation-1 and reservation ID "RM_A$rsvID=106" for operation-3.

After completion of the reservation, the task management unit 200 requests the resource management unit 300 to execute the operation according to the execution schedule shown in FIG. 18. FIG. 21 illustrates a concrete example of the operation execution request transmitted from the task management unit 200 to the resource management unit 300, and the response transmitted from the resource management unit 300 to the task management unit 200, for each operation. For example, as to operation-1, the task management unit 200 transmits "request="execution", requester="DRUGSTORE", reservationID="RM_a$rsvID=105"" to the resource management unit A30. The reservation ID transmitted herein coincides with the reservation ID included in the response to the operation reservation request.

The resource management unit 300, upon receiving the operation execution request, refers to the resource information DB 360, and performs the operation corresponding to the reservation ID included in the operation execution request. After completion of the execution, the resource management unit 300 deletes the reservation information from the resource information DB 360. If the execution of operation is successful, the resource management unit 300 transmits a response notifying "succeeded" to the task management unit 200. After the "succeeded" is obtained for all the operations, execution of the workflow is normally completed.

In the above example, the access control requires a manual operation for the purpose of configuration change of the load balancer 401 and layer-2 switch 402. However, the configuration change itself is not started immediately at the time of access control. This means that those resources can be used normally during the time interval while the manual access control is being applied. During the reservation stage, reservation of resources 400 for execution of configuration change occurs, and other configuration change is restricted at this stage. However, since the access control in a manual operation does not occur at this stage, a situation where the resources are not available does not occur during the time interval while an input by the resource administrator is being awaited.

In the present embodiment, if the access permission/denial attribute is "manual approval", when the resource management unit 300 receives an approval request for a resource, the resource administrator determines the permission/denial of the subject operation of approval, and the result thereof can be reflected in an access control rule. For this reason, it is unnecessary for the resource administrator to create perfect access rules in advance for the automated operation management of a distributed computing system, thereby reducing the initial costs in application of the automated management.

In the present embodiment, execution of the workflow is divided into the approval stage and reservation execution stage, whereby the approval processing which requires a longer time interval can be performed in advance. For this reason, the operation can be performed in a state where the approval processing of the resource operation does not affect the availability of the resources. Therefore, for the automated operation management of distributed computing, a reduction in the availability due to the access control processing in the manual operation can be prevented. In the present embodiment, the execution-schedule creation means creates the workflow execution schedule satisfying the restrictions on the execution time period. For this reason, upon performing operations to a plurality of resources along a workflow, the workflow can be performed in the state where the time restriction for each operation is satisfied. Thus, for the case where the resources of a distributed computing system are separately administrated by a plurality of organizations or sections, the human cost required for observing the restrictions on the time period can be reduced.

Although an example is shown wherein the task administrator and resource administrator use separate administrator's terminals, the task administrator's terminal 103 and resource administrator's terminal 104 may be configured by a common terminal unit. Although FIG. 5 illustrates an example wherein operations in the workflow are consecutively retrieved one by one for the approval processing, a plurality of operations in the workflow can be performed for the approval processing in parallel as well. An example is shown wherein the manual-access-control application means 320 inputs the judgment result of the access control, which is input by the resource administrator, to the access-control-rule application means 310. However, in an alternative thereof or in addition thereto, the manual-access-control application means 320 may refer to a database other than the access control rule DB 350, to judge the access permission/denial, and input the result to the access-control-rule application means 310.

Although an example is shown wherein the access control rule includes a three-type attribute: permitted, denied and manual approval, as the access permission/denial attribute in the above embodiment, the present invention is not limited to this example. For example, a configuration may be adopted wherein "permitted" or "manual approval" may be specified as the access permission/denial attribute, and if the access-control-rule application means 310 finds no matched rule in the control rules, the access-control-rule application means 310 judges that the result of access control is a manual approval.

As described above, although the present invention has been described based on the preferred embodiment, the workflow execution system, method and a program according to the present invention are not limited only to the above exemplified embodiment, and a variety of modifications and alterations may be made from the configuration of the above embodiment without departing from the scope of the present invention.

BRIEF DESCRIPTION OF THE DRAWINGS

FIG. 13 is a table showing an example of the resource information stored in the resource information DB 360 of the resource management unit-A 300.

FIG. 14 is a block diagram showing an example of the definition of workflow configuring the target of execution.

FIG. 15 is a concrete example of the operation approval request transmitted from the task management unit to the resource management unit and the response transmitted from the resource management unit, for each operation.

FIG. 16 is a table showing an example of the access control rule stored in the access control DB 350 of the resource management unit-A 300.

FIG. 17 is a table showing an example of the access control rule stored in the access control DB after addition of a new rule.

FIG. 18 is a time chart showing a concrete example of the execution schedule created by the execution-schedule creation means.

FIG. 19 is a chart showing a concrete example of the operation reservation request transmitted from the task management unit to the resource management unit and the response transmitted from the resource management unit to the task management unit, for each operation.

FIG. 21 is a chart showing a concrete example of the operation execution request transmitted from the task management unit to the resource management unit and the response transmitted from the task management unit to the resource management unit, for each operation.

FIG. 22 is a block diagram showing the configuration of the conventional workflow execution system described in JP-2000-311138A.

Figure 1:
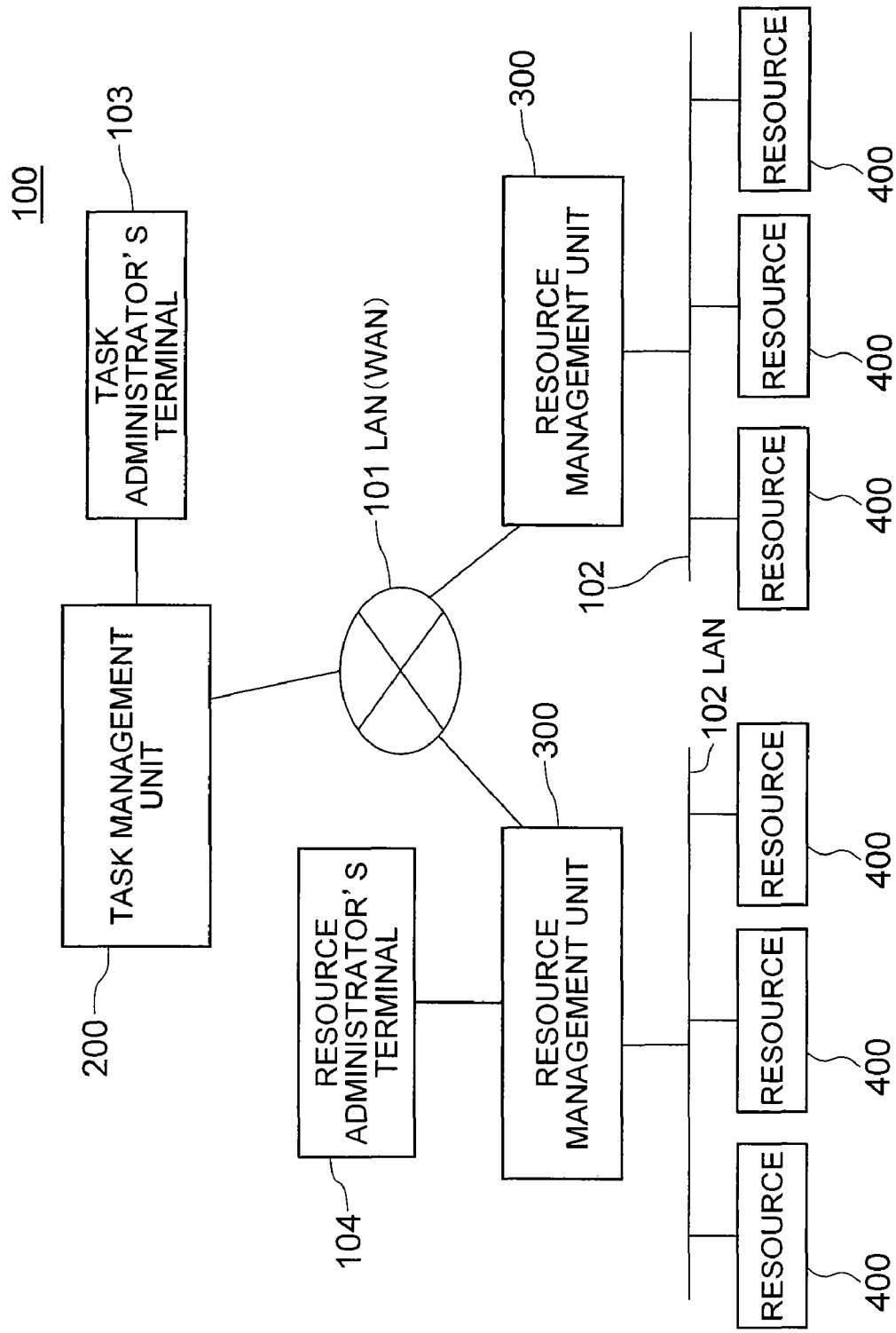
FIG. 1 is a block diagram showing the configuration of a workflow execution system according to an embodiment of the present invention.
Figure 2:
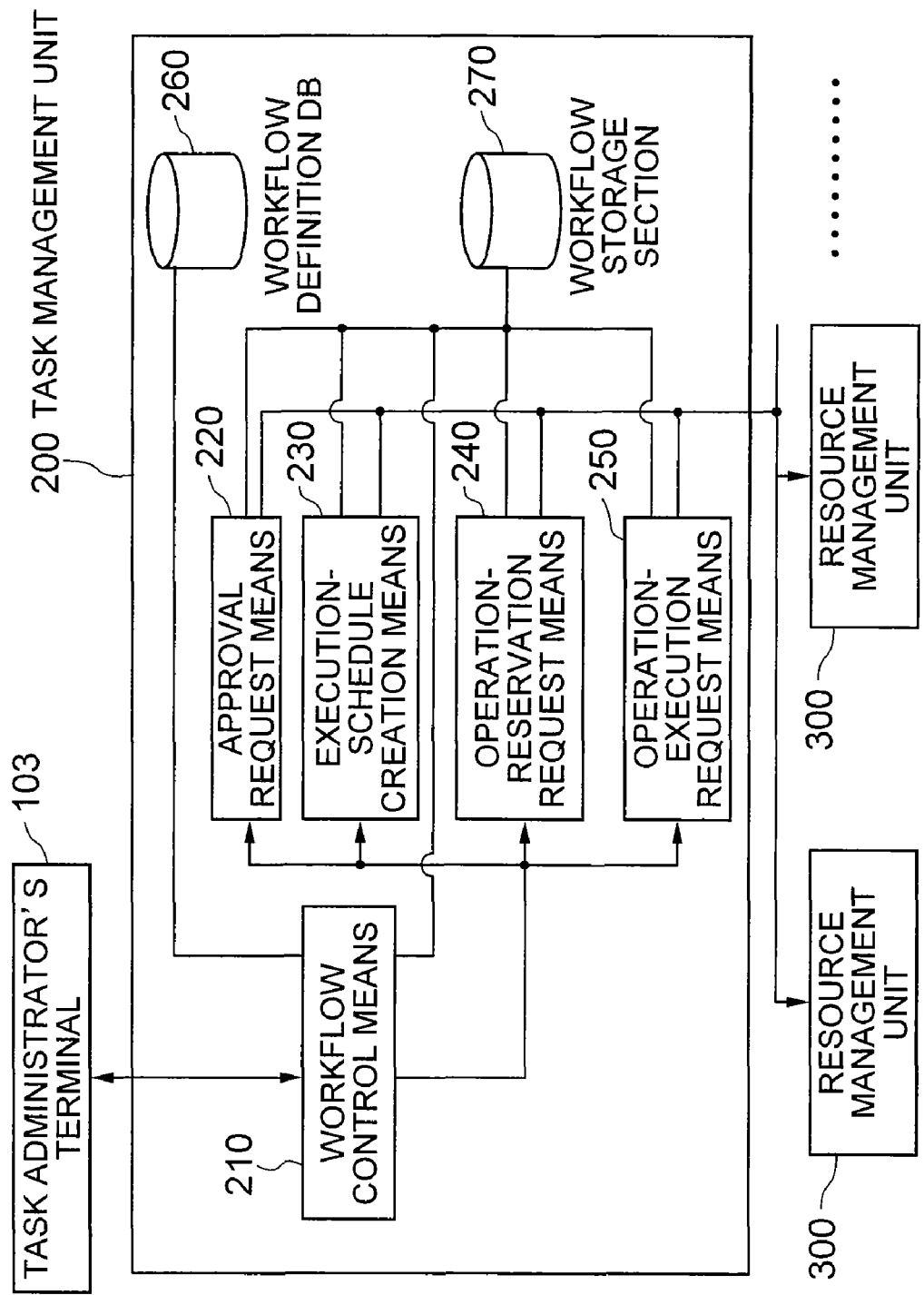
FIG. 2 is a block diagram showing the configuration of the task management unit 200.
Figure 3:
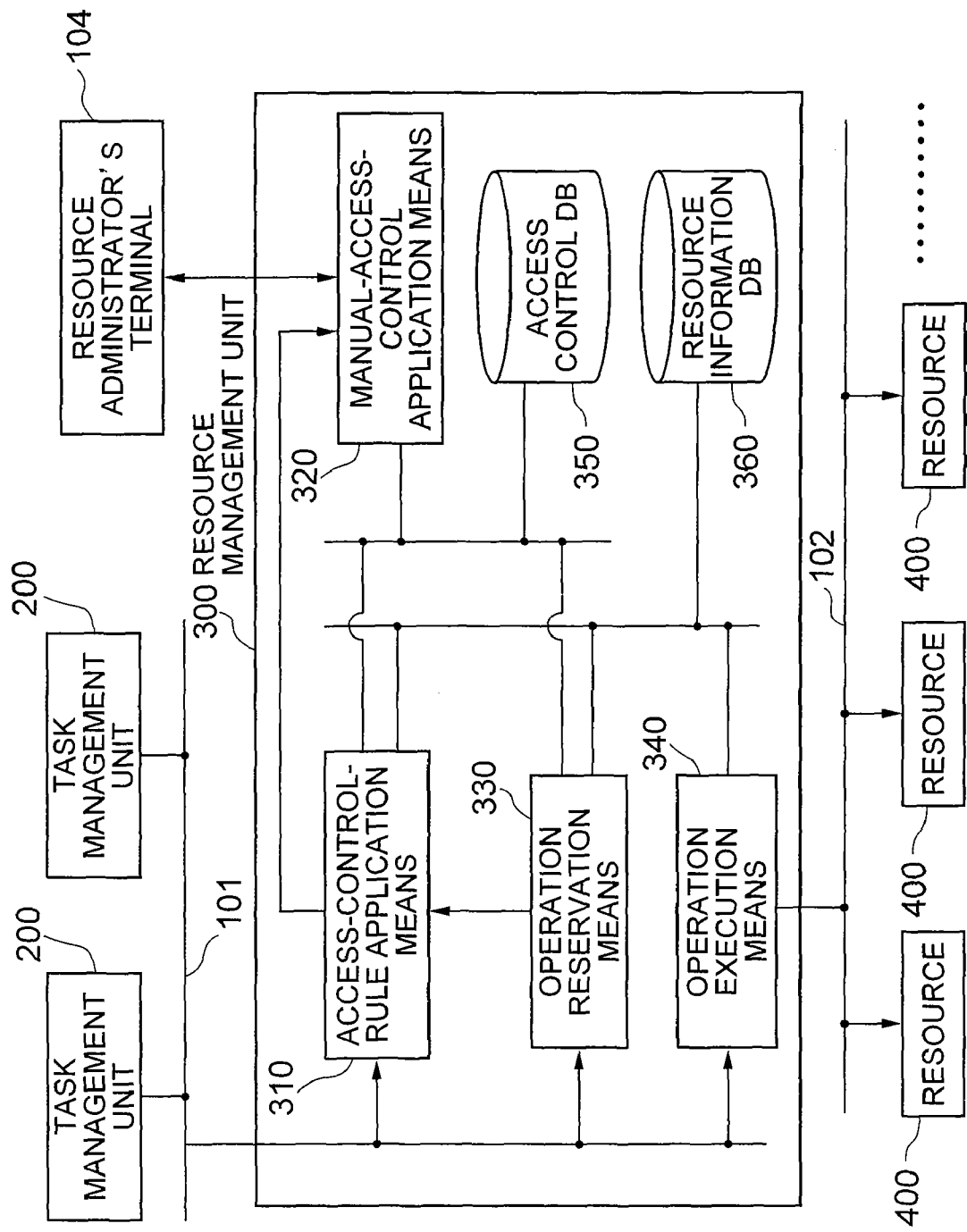
FIG. 3 is a block diagram showing the configuration of the resource management unit 300.
Figure 4:
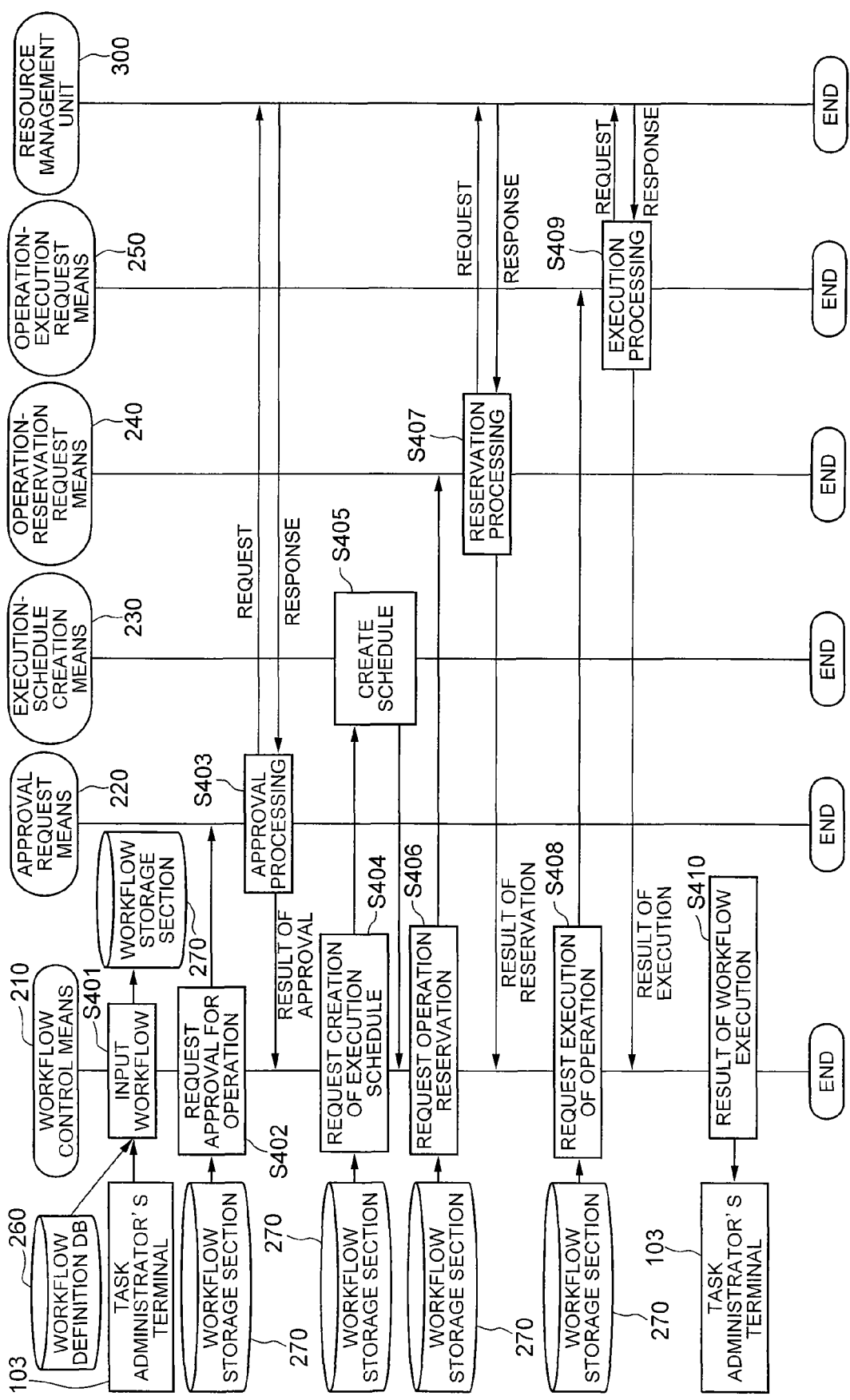
FIG. 4 is a flowchart showing the operating procedure of the task management unit 200.
Figure 5:
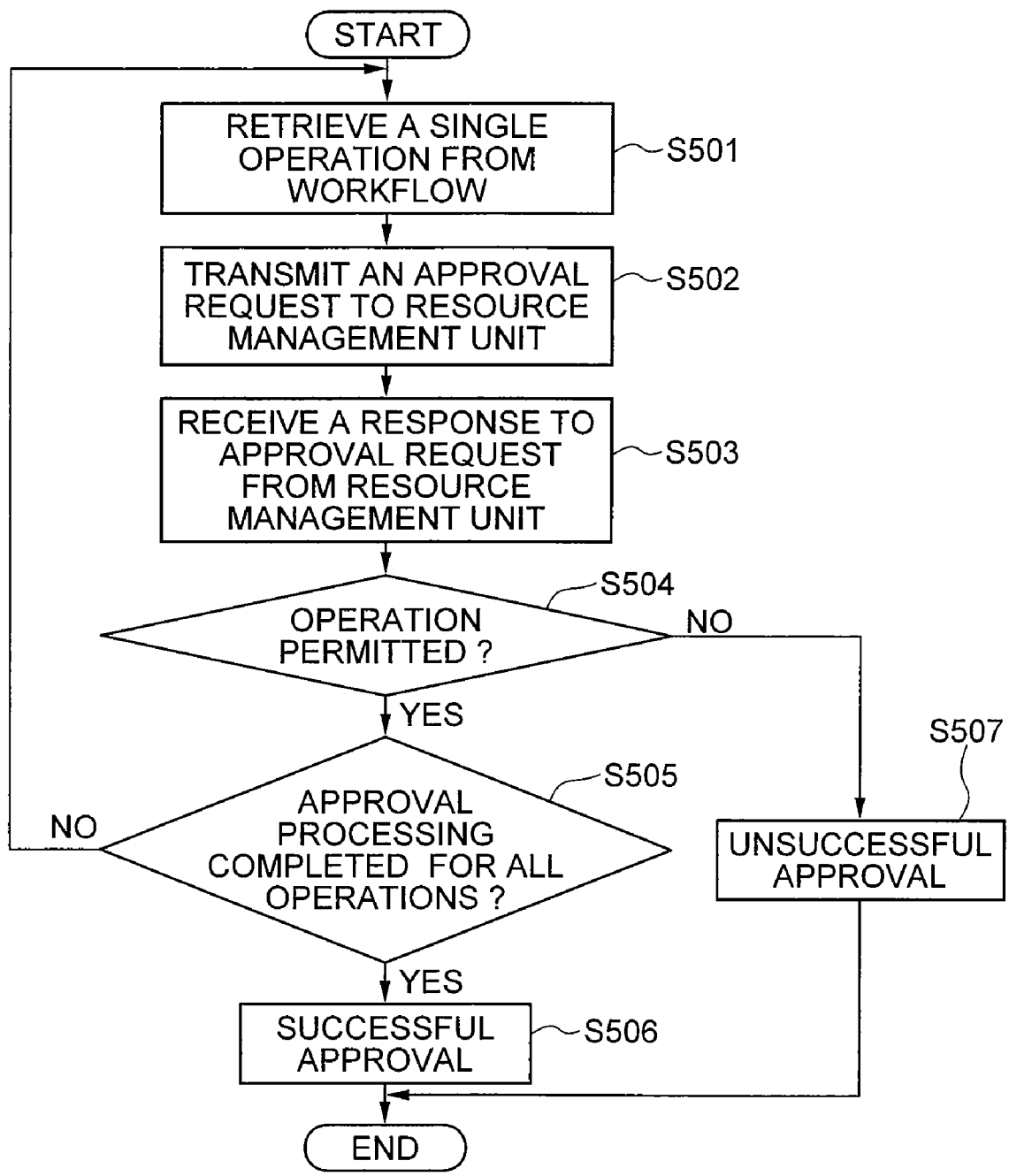
FIG. 5 is a flowchart showing the procedure of an approval processing performed by the approval request means 220.
Figure 6:
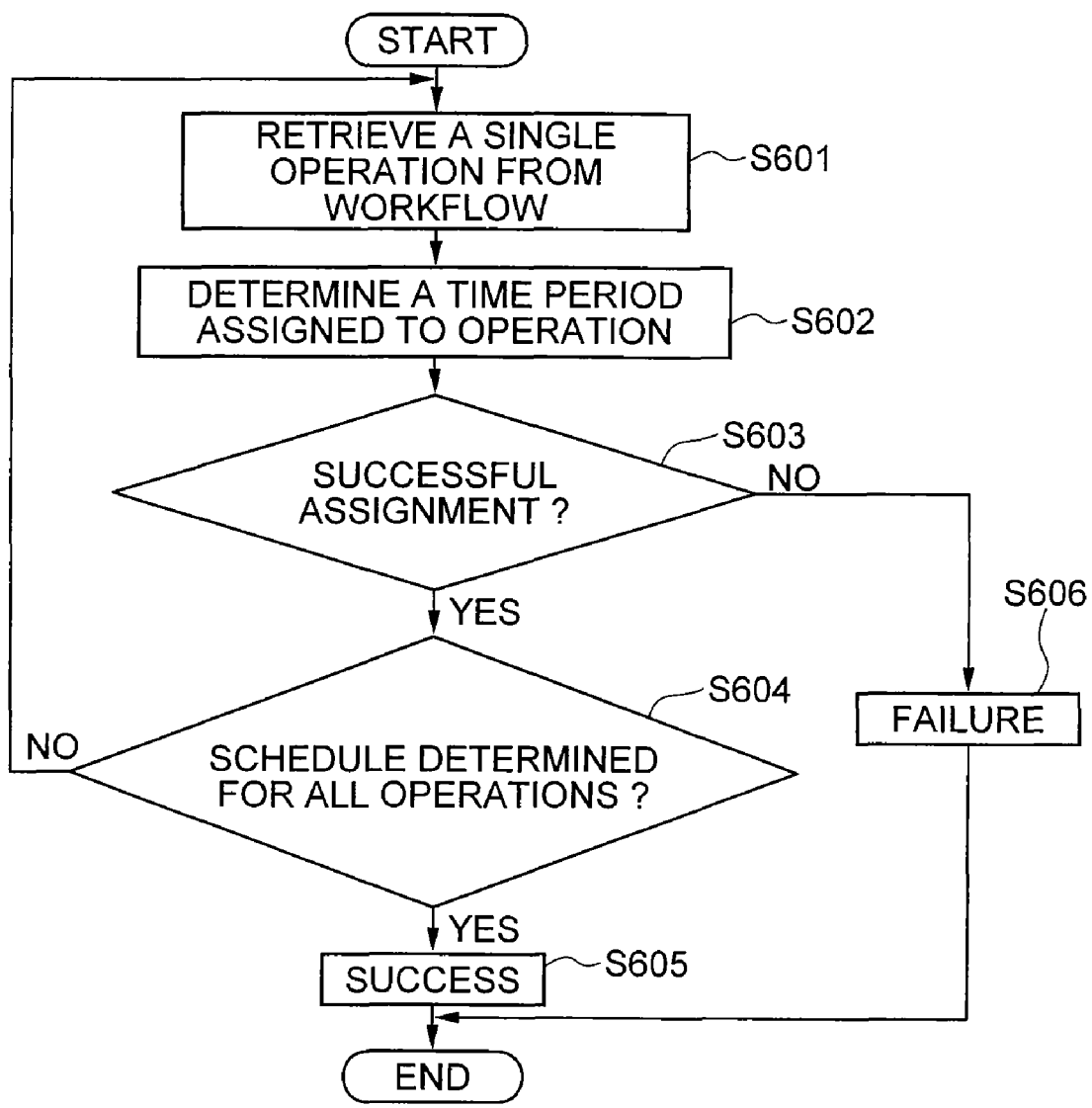
FIG. 6 is a flowchart showing the procedure of creation processing of an execution schedule.
Figure 7:
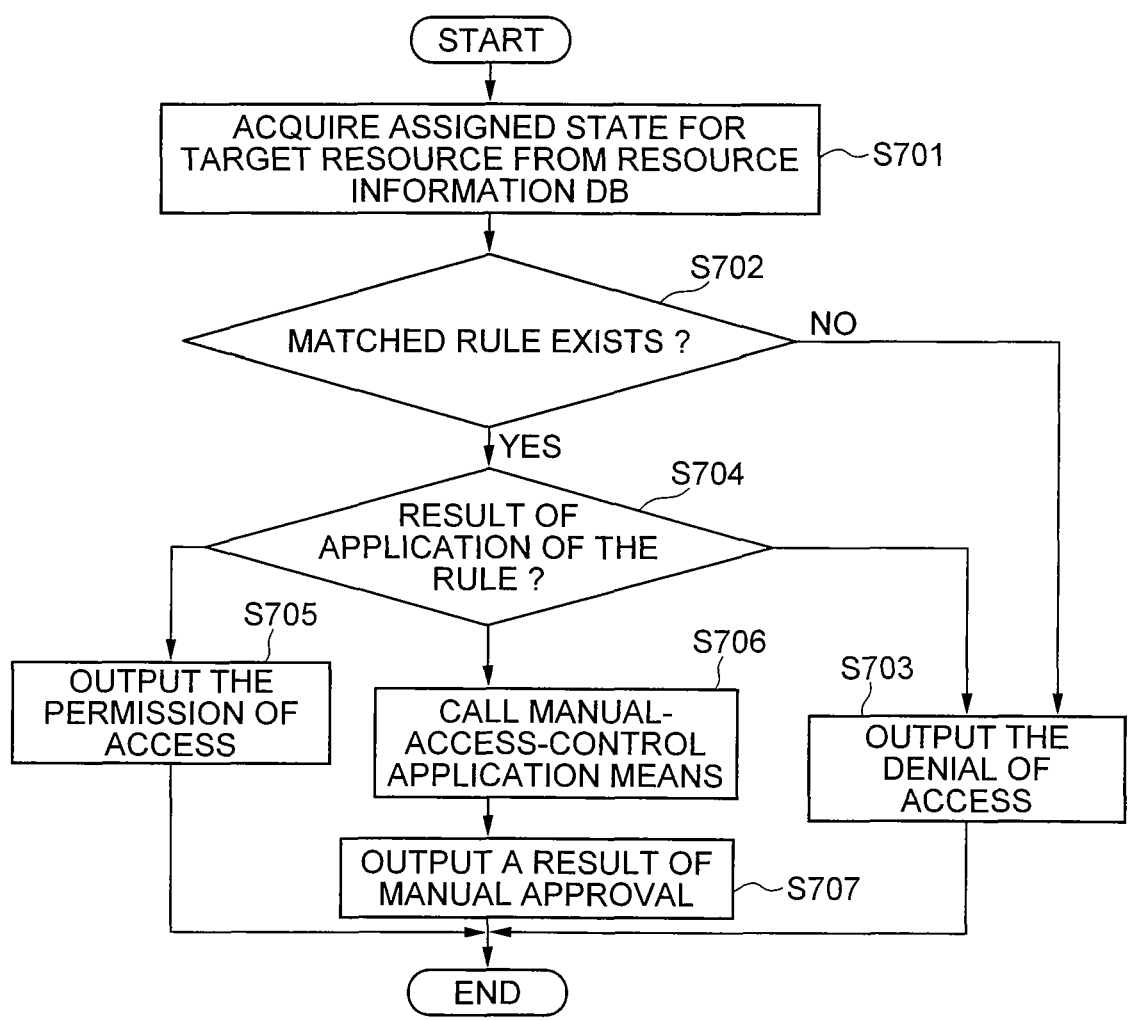
FIG. 7 is a flowchart showing the procedure by the resource management unit 300 during processing in an approval stage.
Figure 8:
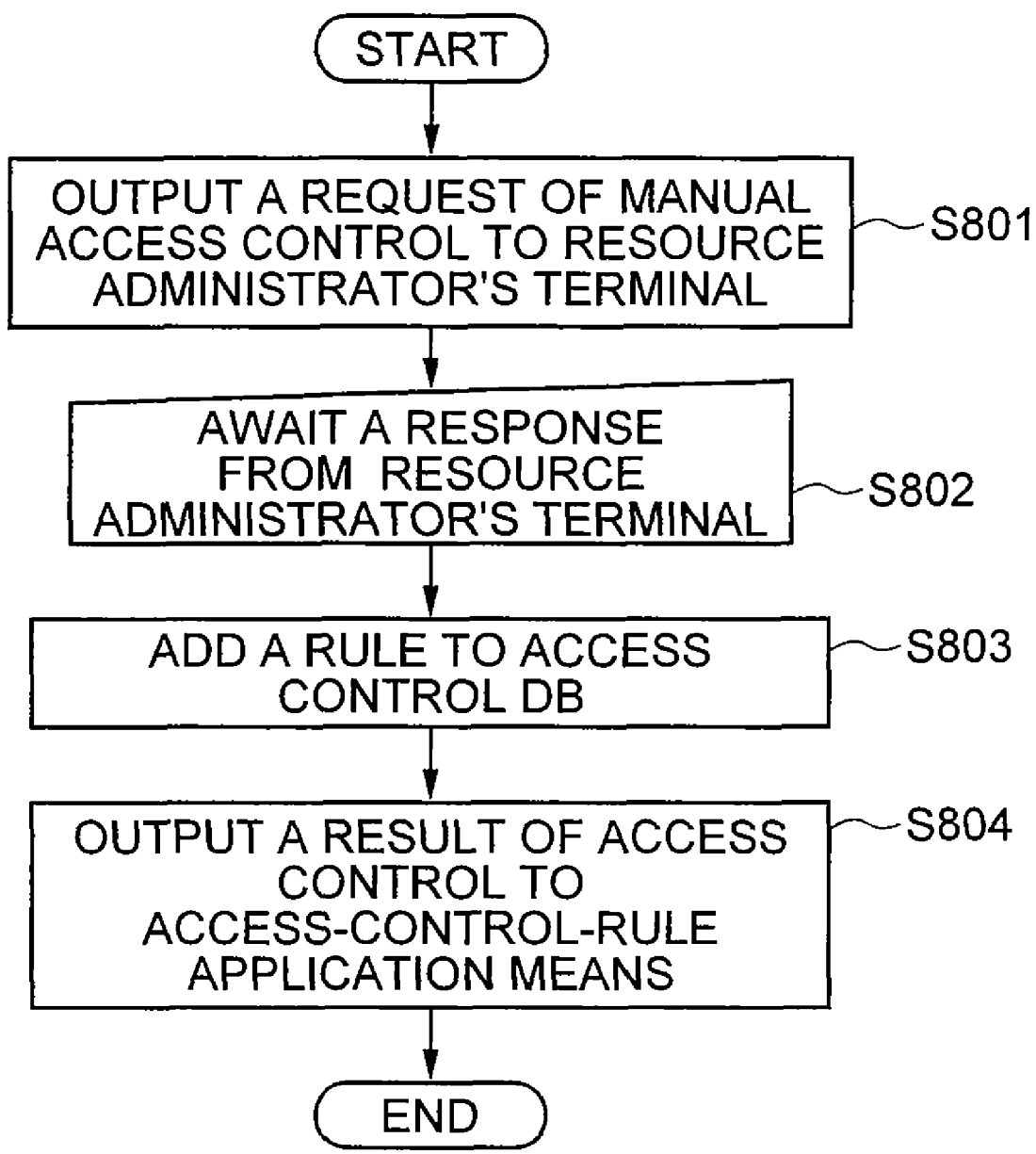
FIG. 8 is a flowchart showing the procedure of the manual approval.
Figure 9:
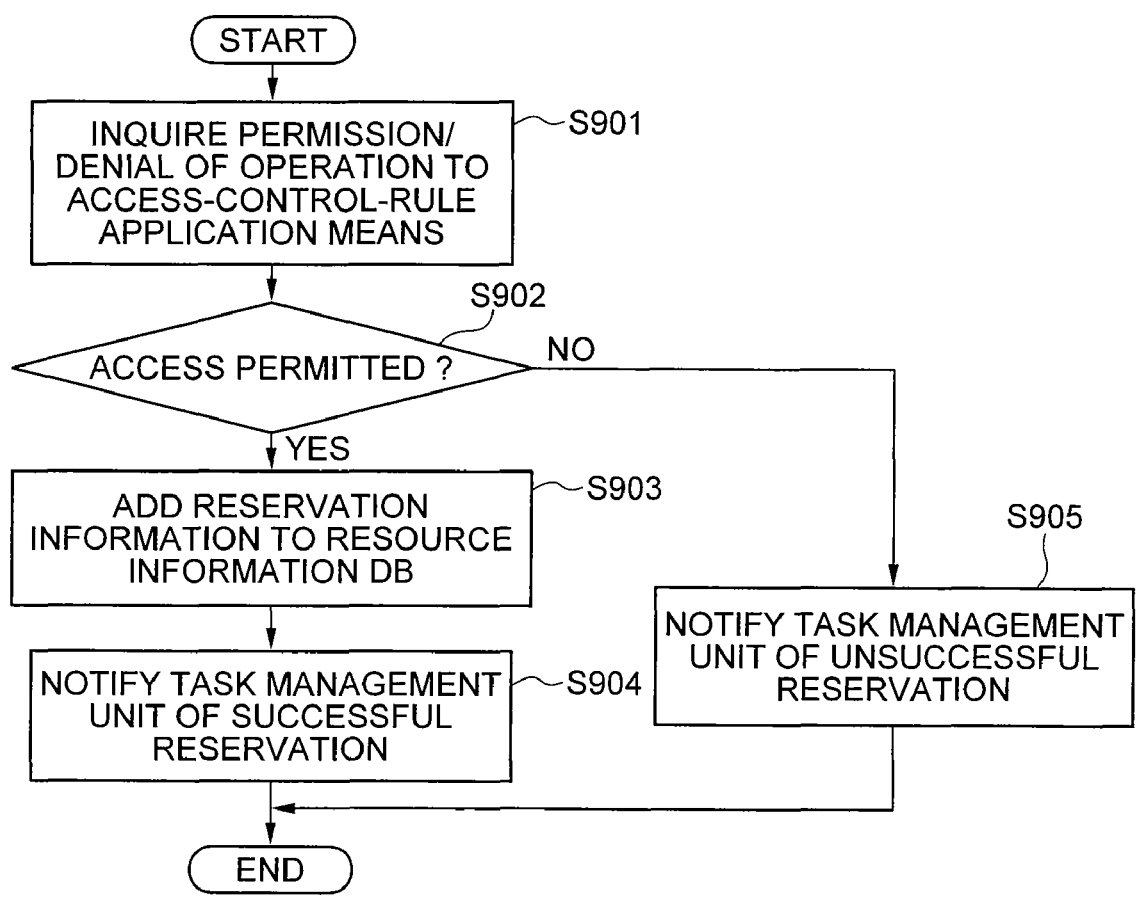
FIG. 9 is a flowchart showing the procedure by the resource management unit 300 during processing in a reservation stage.
Figure 10:
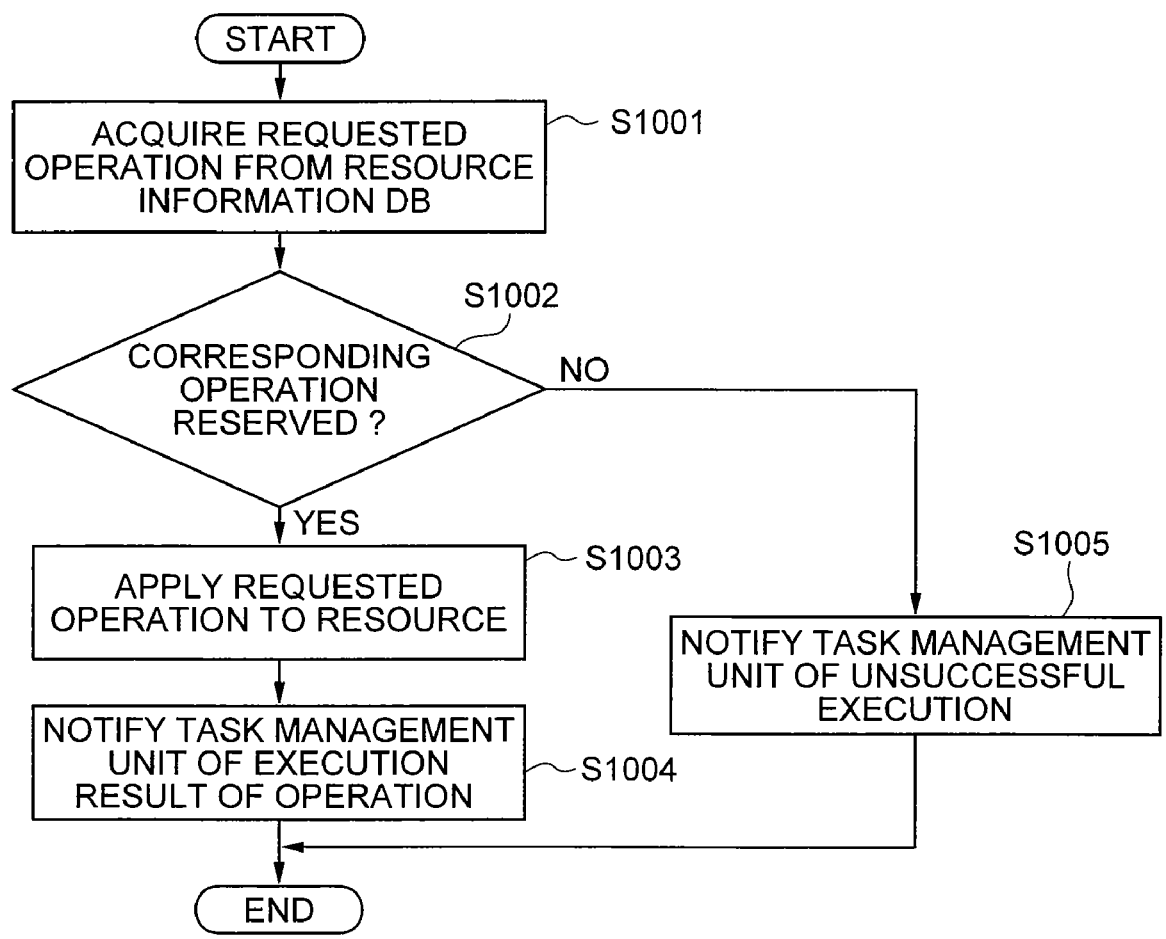
FIG. 10 is a flowchart showing the procedure by the resource management unit 300 during processing in an operation execution stage.
Figure 11:
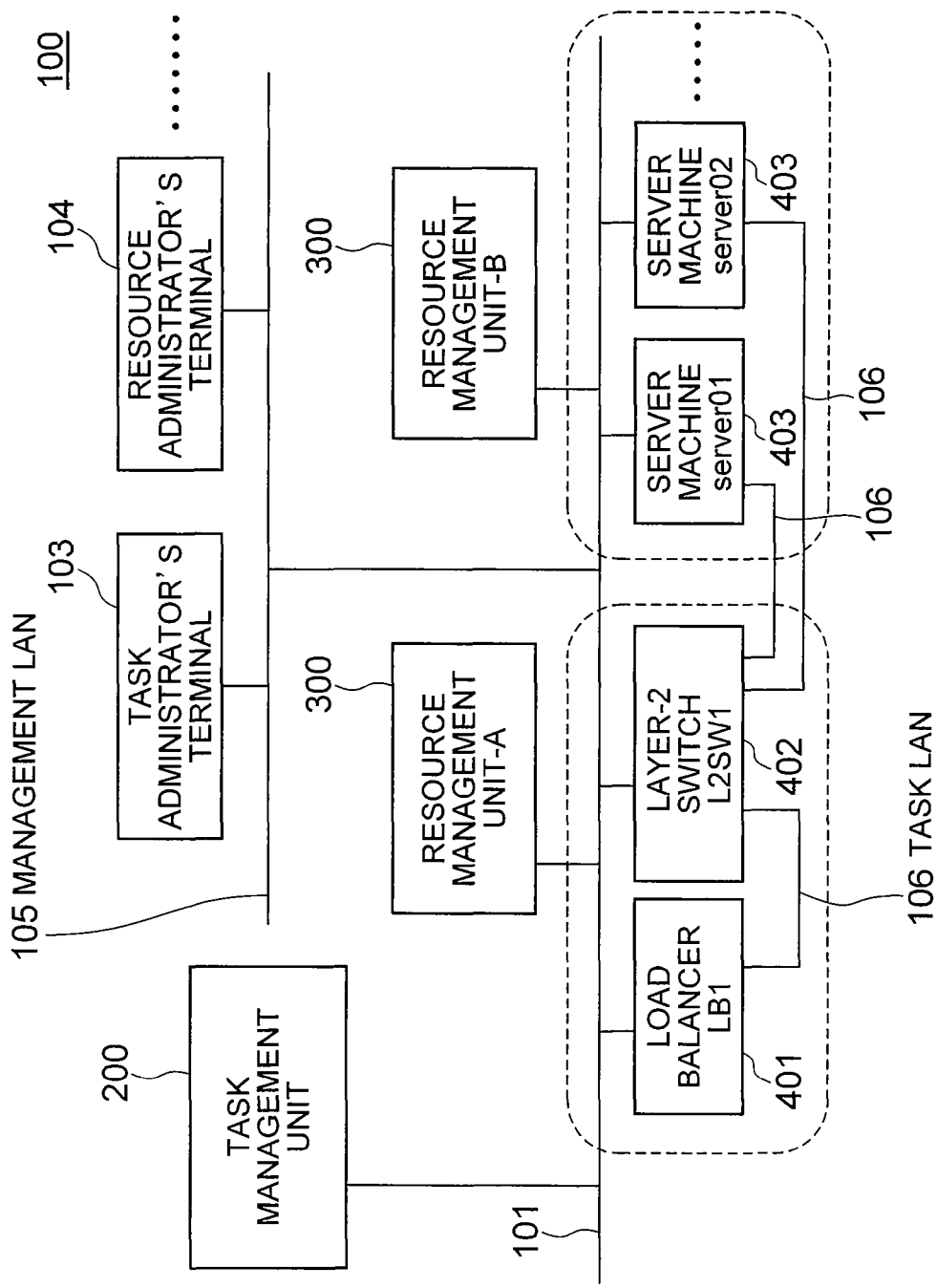
FIG. 11 is a block diagram showing a concrete example of the workflow execution system 100.
Figure 12:
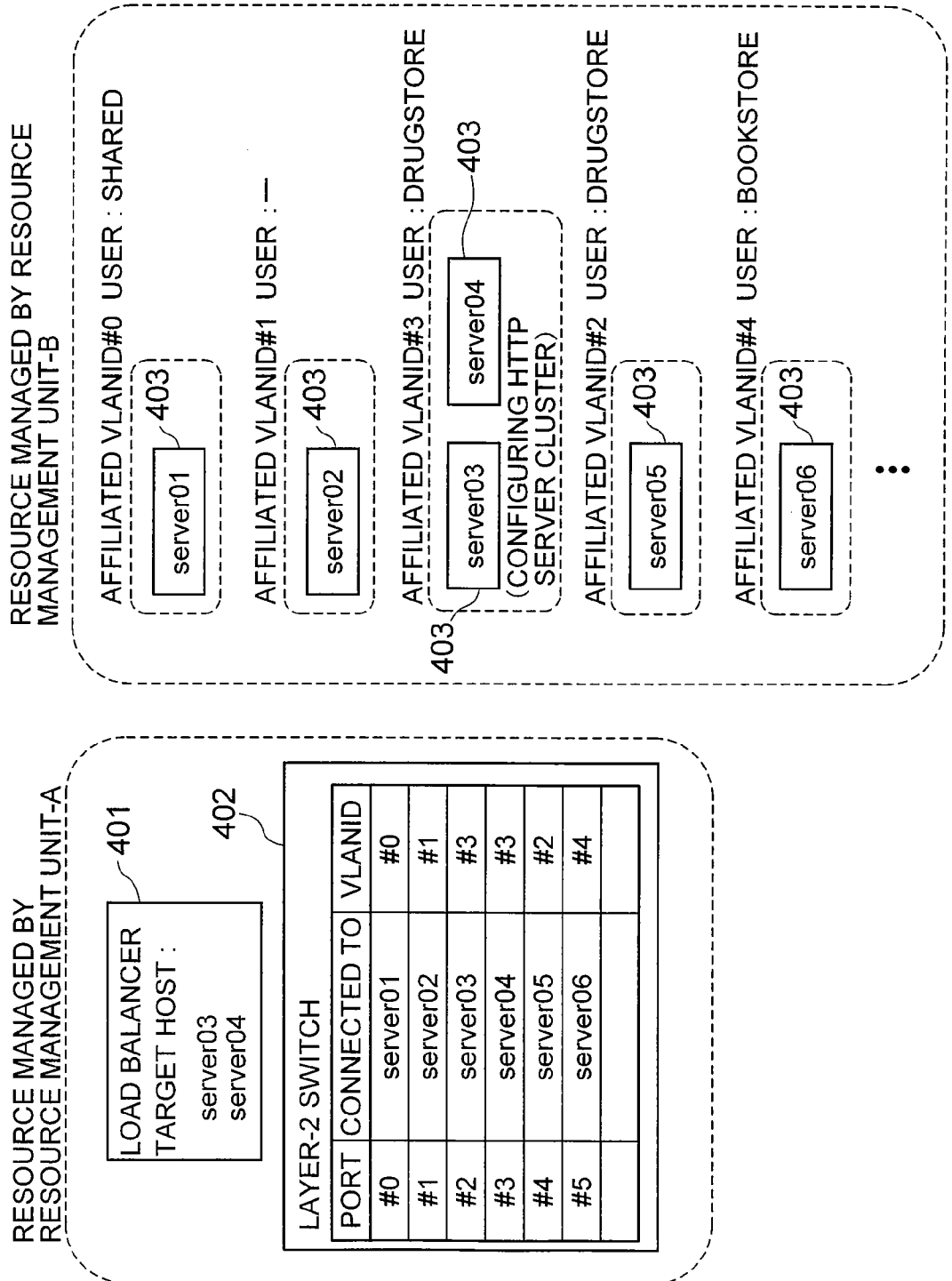
FIG. 12 is a block diagram showing the current status of each resource.
Figure 20:
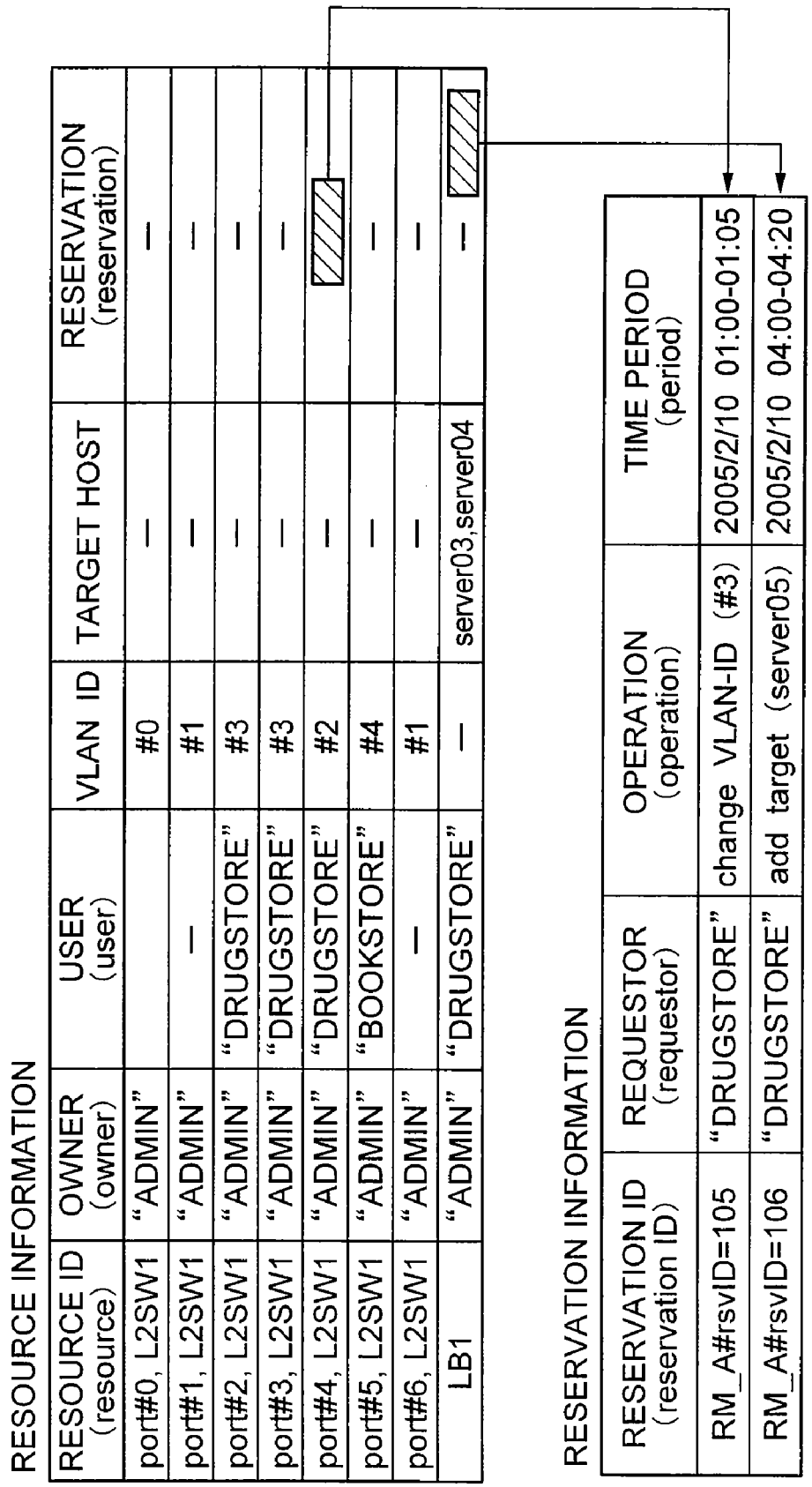
FIG. 20 is a table showing the state of resource information stored in the resource information DB after updating.

The invention claimed is:

1. A workflow execution system for executing based on a workflow operations to a plurality of resources connected to a network, comprising:
approval request means which retrieves each operation from the workflow to be executed, and outputs an access request for said each operation retrieved, said access request including information of a target resource for said each operation, content information of said each operation, and requester identification information of a request for approval, to thereby issue an inquiry whether said each operation is permitted or denied;
access-control-rule application means which refers to a database storing therein one or more access control rules, the one or more access control rules each describing an access permission/denial attribute for a combination including: (a) identification information of a target resource for access, (b) content information of operation to resource, (c) user identification information, and (d) requester identification information, judges in a judgment whether said access request is to be permitted or denied based on said one or more access control rules, wherein if said access-control-rule application means can decide permission or denial based on the access control rules currently stored in said database, said access-control-rule application means outputs a judgment result based on the currently stored access control rules; and if said access permission/denial attribute of the access control rules currently stored in said database is a manual approval, said access-control-rule application means requests an external judgment by a resource administrator specifying whether said access request is to be permitted or denied, and outputs a result of said external judgment; and operation execution means which performs said each operation to resource based on said workflow after an access permission for all of the operations is obtained from said access-control-rule application means, wherein said access-control-rule application means stores said result of said external judgment into said database as a new access control rule.

2. The workflow execution system according to claim 1, further comprising execution-schedule creation means which determines an execution time for said each operation in said workflow and creates a schedule, if a judgment result for said access request by said access-control-rule application means is an access permission for all of the operations.

3. The workflow execution system according to claim 2, further comprising:

reservation request means which outputs, for each operation in said schedule, a reservation request including information of target resource for said each operation, content information of said each operation, identification information of a user that executes said each operation, and execution time information for said each operation; and operation reservation means which transmits, upon receiving said reservation request, an access request to said access-control-rule application means, to issue an inquiry whether said reservation request is permitted or denied, and registers an operation reservation if said reservation is permitted, wherein said operation execution means executes said each operation based on said registered operation reservation.

4. The workflow execution system according to claim 1, wherein if an access permitting time period is specified in said external judgment, said time period is included in said new access control rule.

5. A workflow execution method using a computer for executing, based on a workflow, operations to a plurality of resources connected to a network, comprising:

retrieving each operation from the workflow to be executed, and issuing an access request for said each operation retrieved, said access request including information of a target resource for said each operation, content information of said each operation, and requester identification information of a request for approval;

upon occurring of said access request, referring to a database storing therein one or more access control rules, the one or more access control rules each describing an access permission/denial attribute for a combination including: (a) identification information of a target resource for access, (b) content information of operation to resource, (c) user identification information, and (d) requester identification information, and judging whether said access request is permitted or denied based on said one or more access control rules;

if it is judged that permission or denial can be decided based on the access control rules currently stored in said database, outputting a judgment result based on the currently stored access control rules;

if said access permission/denial attribute of the access control rules currently stored in said database is a manual approval, requesting an external judgment by a resource administrator specifying whether said access request is to be permitted or denied, and outputting a result of said external judgment; and performing said each operation to resource based on said workflow after an access permission for all of the operations is obtained, further comprising the step of storing said result of said external judgment into said database as a new access control rule.

6. The workflow execution method according to claim 5, further comprising the step of determining an execution time for said each operation in said workflow to create a schedule, if a judgment result for said access request by said access permission/denial step is an access permission for all of the operations.

7. The workflow execution method according to claim 6, further comprising the steps of:

outputting, for each operation in said schedule, a reservation request including information of target resource for said each operation, content information of said each operation, identification information of a user that executes said each operation, and execution time information for said each operation; and upon occurring of said reservation request, referring to said database to examine whether said reservation request is to be permitted or denied.

8. A non-transitory computer readable medium encoded with a computer program on which a control processing unit (CPU) is run for executing, based on a workflow, operations to a plurality of resources connected to a network, said program allowing said CPU to perform the processings of:

retrieving each operation from the workflow to be executed, and issuing an access request for said each operation retrieved, said access request including information of a target resource for said each operation, content information of said each operation, and requester identification information of a request for approval;

referring, upon occurring of said access request, to a database storing therein one or more access control rules, the one or more access control rules each describing an access permission/denial attribute for a combination including: (a) identification information of a target resource for access, (b) content information of operation to resource, (c) user identification information, and (d) requester identification information, and judging whether said access request is permitted or denied based on said one or more access control rules;

if it is judged that permission or denial can be decided based on the access control rules currently stored in said database, outputting a judgment result based on the currently stored access control rules;

if said access permission/denial attribute of the access control rules currently stored in said database is a manual approval, requesting an external judgment by a resource administrator specifying whether said access request is to be permitted or denied, and outputting a result of said external judgment;

performing said each operation to resource based on said workflow after an access permission for all of the operations is obtained; and storing said result of said external judgment into said database as a new access control rule.

9. The non-transitory computer readable medium encoded with the program according to claim 8, further allowing said CPU to perform the processing of determining an execution time for said each operation in said workflow to create a schedule, if a judgment result for said access request by said access permission/denial processing is an access permission for all of the operations.

10. The non-transitory computer readable medium encoded with the program according to claim 9, further allowing said CPU to perform the processings of:

outputting, for each operation in said schedule, a reservation request including information of target resource for said each operation, content information of said each operation, identification information of a user that executes said each operation, and execution time information for said each operation; and referring, upon occurring of said reservation request, to said database to examine whether said reservation request is to be permitted or denied.

11. An access control unit for restricting an access from a user executing an operation to a plurality of resources connected to a network, comprising:

a database which stores therein one or more access control rules, the one or more access control rules each describing a permission/denial attribute for a combination including: (a) identification information of a target resource for access, (b) content information of operation to resource, (c) user identification information, and (d) requester identification information; and access-control-rule application means which refers to said database upon occurrence of an access request, and judges whether said access request is to be permitted or denied based on said one or more access control rules, wherein:

if said access-control-rule application means can decide permission or denial based on the access control rules currently stored in said database, said access-control-rule application means outputs a judgment result based on the currently stored access control rules; and if said access permission/denial attribute of the access control rules currently stored in said database is a manual approval, said access-control-rule application means requests an external judgment by a resource administrator specifying whether said access request is to be permitted or denied, outputs a result of said external judgment, and stores said result of said external judgment into said database as a new access control rule.

* * * * *